United States Patent
Yamamoto

(10) Patent No.: US 7,186,781 B2
(45) Date of Patent: Mar. 6, 2007

(54) FULLERENE-CONTAINING POLYMER, PRODUCING METHOD THEREOF, AND PHOTOREFRACTIVE COMPOSITION

(75) Inventor: Michiharu Yamamoto, Carlsbad, CA (US)

(73) Assignee: Nitto Denko Corporation, Osaka (JP)

( * ) Notice: Subject to any disclaimer, the term of this patent is extended or adjusted under 35 U.S.C. 154(b) by 267 days.

(21) Appl. No.: 10/895,726

(22) Filed: Jul. 21, 2004

(65) Prior Publication Data

US 2004/0265740 A1 Dec. 30, 2004

Related U.S. Application Data

(62) Division of application No. 10/263,544, filed on Oct. 2, 2002, now Pat. No. 6,809,156.

(51) Int. Cl.
*C08F 8/00* (2006.01)
(52) U.S. Cl. .............................. 525/326.7; 525/328.2; 525/360
(58) Field of Classification Search ............. 525/326.7, 525/328.2
See application file for complete search history.

(56) References Cited

U.S. PATENT DOCUMENTS 5,807,937 A 9/1998 Matyjaszewski et al.
6,090,332 A 7/2000 Marder et al.

FOREIGN PATENT DOCUMENTS

JP 10-333195 12/1998

OTHER PUBLICATIONS

K. Tamura, et al., New polymeric material containing the tricyanovinylcarbazole group for photorefractive applications, Appl. Phys. Lett. 60 (15), Apr. 13, 1992, pp. 1803-1805.
T. Kawakami, et al., Photoinduced refractive index change in a photoconductive electro-optic polymer, Appl. Phys. Lett. 62 (18), May 3, 1993, pp. 2167-2169.

Peng Zhou, et al, Synthesis of $C_{60}$-End-Bonded Polymers with Designed Molecular Weights and narrow Molecular Weight Distributions via Atom Transfer Radical Polymerization, Macromolecules 2000, 33, 1948-1954, 2000 American Chemical Society Published on Web Feb. 25, 2000.
Hisaya Sato, et al., Synthesis and Characterization of Photorefractive Polymeric Material with high Charge Mobility, Technical Report of IEICB (1005-10), pp. 43-45.
Jin-Shan Wang, et al., Controlled/"Living" Radical Polymerization. Halogen Atom Transfer Radical Polymerization Promoted by a Cu(I)/Cu(II) Redox Process, Macromolecules, vol. 28 No. 23, 1995, pp. 7901-7910.
Tsuyoshi Ando, et al., Living Radical Polymerization of Methyl Methacrylate with Ruthenium Complex: Formation of Polymers with Controlled Molecular Weights and Very Narrow Distributions, Macromolecules, vol. 29, No. 3, 1996, pp. 1070-1072.
M.A. Diaz-Garcia, et al., Photorefractive Properties of Poly(*N*-vinyl carbazole)-Based Composites for High-Speed Applications, Chem. Mater., vol. 11 No. 7, 1999, pp. 1784-1791.
Eric Hendrickx, et al., Photoconductive properties of PVK-based photorefractive polymer composites doped with fluorinated styrene chromophores, J. Mater., Chem., 1999, 9, 2251-2258.
Yi-Wang Chen, et al., Photorefractive Effect in a New Composite Based on Bifunctional Host Polymer, Journal of Applied Polymer Science, vol. 77, 189-194 (2000).
David Van Steenwinckel, et al., Fully Functionalized Photorefractive Polymethacrylates with net Gain at 780 nm, Macromolecules, vol. 33, No. 11, 2000, 4074-4079.
Timothy E. Patten, et al., Radical Polymerization Yielding Polymers with $M_w/M_n \sim 1.05$ by Homogeneous Atom Transfer Radical Polymerization, Department of Chemistry Carnegie Mellon University Pittsburgh, PA, pp. 575-576.

*Primary Examiner*—Bernard Lipman
(74) *Attorney, Agent, or Firm*—Knobbe Martens Olson & Bear LLP

(57) ABSTRACT

A composition comprising a fullerene-containing polymer obtained by reacting a polymer prepared by living radical polymerization with a fullerene, wherein: (a) the living radical polymerization is carried out using a monomer, a polymerization initiator, transition metal catalyst and a ligand capable of reversibly forming a complex with the transition metal catalyst, (b) the polymer comprises at least one of a first repeat unit including a moiety having charge transport ability and a second repeat unit including a moiety having non-linear-optical ability, and (c) the composition exhibits photorefractive ability.

14 Claims, No Drawings

FULLERENE-CONTAINING POLYMER, PRODUCING METHOD THEREOF, AND PHOTOREFRACTIVE COMPOSITION

CROSS-REFERENCE TO RELATED APPLICATION

This is a divisional of U.S. application Ser. No. 10/263,544 filed on Oct. 2, 2002, now U.S. Pat. No. 6,809,156, and the complete disclosure of which is hereby incorporated by this reference in its entirety.

BACKGROUND OF THE INVENTION

1. Field of the Invention

The invention relates to a polymer, producing method thereof, and photorefractive composition. More particularly, the invention relates to polymers and copolymers that contain fullerene moiety at the backbone (co)polymer chain, and to methods of making such polymers. Also, the invention relates to the compositions that include such polymer and provide photorefractive capabilities.

2. Description of the Related Art

Photorefractivity is a phenomenon in which the refractive index of a material can be altered by changing the electric field within the material, such as by intense laser beam irradiation. The change of refractive index is achieved by a series of steps, including: (1) charge generation by laser irradiation, (2) charge transport, resulting in separation of positive and negative charges, and (3) trapping of one type of charge (charge delocalization), (4) formation of a non-uniform internal electric field (space-charge field) as a result of charge delocalization, and (5) refractive index change induced by the non-uniform electric field.

Therefore, good photorefractive properties can be seen only for materials that combine good charge generation, good charge transport, or photoconductivity, and good electro-optical activity.

Photorefractive materials have many promising applications, such as high-density optical data storage, dynamic holography, optical image processing, phase conjugated mirrors, optical computing, parallel optical logic, and pattern recognition.

Originally, the photorefractive effect was found in a variety of inorganic electro-optical (EO) crystals, such as $LiNbO_3$. In these materials, the mechanism of the refractive index modulation by the internal space-charge field is based on a linear electro-optical effect.

In 1990 and 1991, the first organic photorefractive crystal and polymeric photorefractive materials were discovered and reported. Such materials are disclosed, for example, in U.S. Pat. No. 5,064,264, to Ducharme et al. Organic photorefractive materials offer many advantages over the original inorganic photorefractive crystals, such as large optical nonlinearities, low dielectric constants, low cost, light-weight, structural flexibility, and ease of device fabrication. Other important characteristics that may be desirable depending on the application include sufficiently long shelf life, optical quality, and thermal stability. These kinds of active organic polymers are emerging as key materials for advanced information and telecommunication technology.

In recent years, efforts have been made to optimize the properties of organic, and particularly polymeric, photorefractive materials. As mentioned above, good photorefractive properties depend upon good charge generation, good charge transport, also known as photoconductivity, and good electro-optical activity. Various studies that examine the selection and combination of the components that give rise to each of these features have been done.

The photoconductive or charge transport capability is frequently provided by incorporating materials containing phenyl amine derivative groups. Some examples of phenyl amine derivative groups are carbazole, triphenyl amine, or tetraphenyldiamine group containing derivatives.

Typical examples of carbazole, triphenyl amine, or tetraphenyldiamine group containing derivatives are carbazoyl alkyl derivative, carbazoyl type polymer, polyvinylcarbazole (PVK), triphenyl amine alkyl derivative, triphenyl amine type polymer, and tetraphenyldiamine (TPD) group containing polymers.

The electro-optical capability is generally provided by including chromophore or dye compounds, such as an azo-type or other electron donor and acceptor functional group containing derivatives. The charge generation capability can be generally obtained by a material known as a sensitizer, including wide range of fullerene derivatives, which can generate photo-electron by light irradiation.

Usually, fullerene derivative compounds provide better photo-electron generation ability than other fluorenone derivatives, which also work as a good photo-electron generation sensitizer.

The fullerenes are general novel class materials which are composed of only carbon atom and have ball shape chemical structure. Typically, $C_{60}$ is known as a prototype. As other examples, $C_{70}$, $C_{76}$, $C_{78}$, $C_{84}$ and their mixture are also categolized as fullerenes. Furthermore, chemically modified derivatives are also belong to a class material of fullerene. The soccer-ball-shaped molecules possess three-dimensional p-delocalized electrons, a property that gives rise to a large nonresonant, instantaneous response.

The photorefractive composition may be made simply by mixing these molecular components that provide the individual properties required into a host polymer matrix. Several composition which showed good photorefractivity have been developed and studied.

For example, in PVK-based materials, the space-charge field that gives rise to the change in refractive index is built up on a sub-second time scale because of the high charge transport ability of the PVK matrix.

Japanese Patent Application Laid-open JP-A 1998-333195, to Showa Denko, discloses acrylate-based polymers incorporating triphenylamine groups as charge transport agents. Fast response times (50 msec. at 70 V/µm biased voltage), although there is no description or data regarding diffraction efficiency.

Also, there are other approach to put the photoconductivity (charge transport) capability part and the non-linear optical capability into one single polymer chain. It has been recognized that it would be desirable to prepare bi-functionalised photorefractive polymers, that is, polymers in which both the photoconductivity and the non-linear optical capability reside within the polymer itself.

As examples of these type polymers, PVK polymers in which some of the carbazole groups are tricyanovinylated have been made (N. Peyghambarian et al., *Applied Phys. Lett.*, 1992, 60, 1803). Subsequently, the same group has reported PVK-based materials with an fast response time and a very high photoconductivity. (N. Peyghambarian et al., *J. Mater. Chem.*, 1999, 9, 2251).

A number of efforts at materials improvement have used methacrylate-based polymers and copolymers that include photoconductive and chromophore side groups. A paper by T. Kawakami and N. Sonoda, (*Applied Phys. Lett.*, 1993, 62, 2167.) discloses acrylate-based polymers containing dicyanovinylideneyl phenylamines as charge transport groups.

A report by H. Sato et al., (Technical report of IEICE., 1995, OME-95-53, OPE95-94, 43) describes the preparation of several copolymers having both charge transport components and non-linear optical components in the side groups of the copolymer. However, the charge transport speeds seem to be too slow for good photorefractive materials.

A paper by Van Steenwickel et al. (*Macromolecules*, 2000, 33, 4074) describes acrylate-based polymers that include carbazole-based side chains and several stilbene-type side chains. The paper cites a high diffraction efficiency of 60% at 58 V/μm, but a slow response time of the sub-second order.

A paper by Y. Chen et al. (*Modern Optics*, 1999, 46, 1003) discusses a methacrylate polymer that has both carbazole-type side chains to provide charge transport capability and nitrophenyl azo-type side chains to provide non-linear optical capability. The materials again show slow response times of over 20 sec.

All of the materials described above utilize low molecular weight sensitizer molecule as an additive. Particularly, fullerene derivatives are mostly used for a sensitizer, because fullerene gives the most efficient photo-electron generation. However, fullerene derivatives have very low solubility with either solvents or other components. Sometimes the fullerenes are clustered out into small solid particle in the photorefractive composition, due to the small solubility into components. This clustering phenomenon make compositions less transparent composition or light scattering, which leads to poor photorefractivity. Furthermore, the small solid particle can cause electric breakdown, when high voltage is applied onto the photorefrative composition during sample measurement. In order to avoid this kind of problem, new type of the fullerene incorporation methods have been demanded.

In recent years, a new type of polymerization, termed living radical polymerization, has been developed for polymerization of functional monomers, including methacrylate and styrene derivatives. Living radical polymerization differs from conventional radical polymerization in that the polymer growth terminals can be temporarily protected by protection bonding. This enables polymerization to be well controlled, including being stopped and started at will.

This process can be used to prepare homopolymers and copolymers, including block copolymers. Details of the living radical polymerization method are described in the literature. They may be found, for example, in the following papers:
1. T. Patten et al., "Radical polymerization yielding polymers with Mw/Mn~1.05 by homogeneous atom transfer radical polymerization", *Polymer Preprints*, 1996, 37, 575.
2. Matyjasewski et al., "Controlled/living radical polymerization. Halogen atom transfer radical polymerization promoted by a Cu(I)/Cu(II) redox process",*Macromolecules*, 1995, 28, 7901.
3. M. Sawamoto et al., "Ruthenium-mediated living radical polymerization of methyl methacrylate", *Macromolecules*, 1996, 29, 1070.

Living radical polymerization is also described in U.S. Pat. No. 5,807,937 to Carnegie-Mellon University, which is incorporated herein by reference in its entirety.

The only example known to the present inventor of fullerene-containing polymer preparation by living radical polymerization is in a paper by F. M. Li et.al. (*Macromolecules*, 2000, 33, 1948). This reference discloses the polymerization for a $C_{60}$ fullerene-containing styrene polymer, using a copper halide catalysis. No photorefractive or electro-optical performance data are reported in the citation.

SUMMARY OF THE INVENTION

The object of the present invention is to provide polymers and copolymers that contain fullerene moiety at the backbone (co)polymer chain, and to methods of making such polymers. Also, the invention relates to the compositions that include polymer which exhibits high photorefractivity and is desirably used for the photorefractive composition, and producing method thereof.

A first aspect of the present invention is a polymer represented by a formula selected from the group consisting of formulae (I), (II), (III) and (IV):

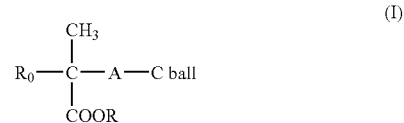

(I)

wherein $R_0$ represents a hydrogen atom or alkyl group with up to 10 carbons; R is selected from the group consisting of a hydrogen atom, a linear alkyl group with up to 10 carbons, a branched alkyl group with up to 10 carbons, and an aromatic group with up to 10 carbons; C ball is a functional group selected from the class of fullerenes; A represents a repeating structure comprising at least one of the below repeating unit 1 and repeating unit 2;

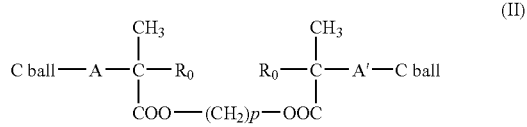

(II)

wherein p is an integer of 2 to 6; A' represents a repeating structure comprising at least one of the below repeating unit 1 and repeating unit 2;

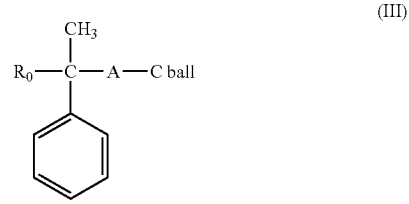

(III)

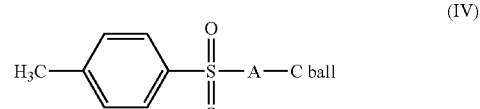

(IV)

repeating unit 1

-continued repeating unit 2

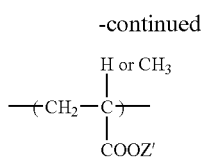

wherein Z is represented by a structure selected from the group consisting of structures (i), (ii) and (iii); and Z' is represented by formula (0);

formula (0)

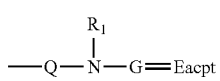

wherein Q represents an alkylene group, with or without a hetero atom; such as oxygen or sulfur, and preferably Q is an alkylene group represented by $(CH_2)p$; where p is an integer of about 2 to 6; $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group which is selected from methyl, ethyl, propyl, butyl, pentyl and hexyl; G is a group having a bridge of π-conjugated bond; and Eacpt is an electron acceptor group;

wherein the structures (i), (ii) and (iii) are:

Structure (i)

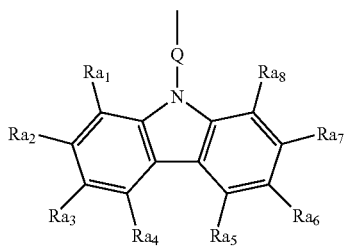

wherein Q represents an alkylene group, with or without a hetero atom, such as oxygen or sulfur, and preferably Q is an alkylene group represented by $(CH_2)p$; where p is an integer of about 2 to 6; and wherein $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

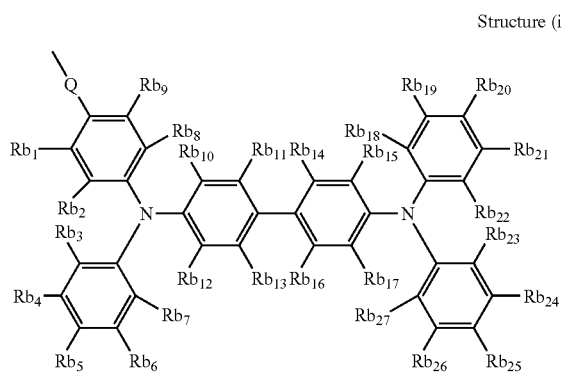

wherein $Rb_1$–$Rb_{27}$ are independently selected from the group consisting of a hydrogen atom, a linear alkyl group with up to 10 carbons, a branched alkyl group with up to 10 carbons, and an aromatic group with up to 10 carbons; and Structure (iii)

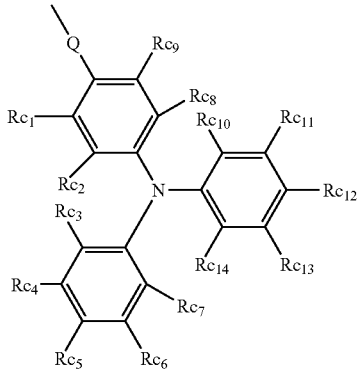

wherein $Rc_1$–$Rc_{14}$ are independently selected from the group consisting of a hydrogen atom, a linear alkyl group with up to 10 carbons, a branched alkyl group with up to 10 carbons, and an aromatic group with up to 10 carbons.

A second aspect of the present invention is a method for producing a fullerene-containing polymer comprising: polymerizing a monomer by a living radical polymerization technique to form a polymer, wherein the monomer comprises a structure selected from the group consisting of the above structures (i), (ii) and (iii); and reacting the polymer with a fullerene to produce a fullerene-containing polymer, wherein the fullerene-containing polymer is represented by a formula selected from the group consisting of the following formulae (Ia), (IIa), (IIIa) and (IVa):

(Ia)

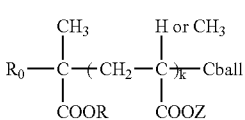

wherein $R_0$, R, Z, and Cball each have the same meaning as in formula (I); and k is an integer of 10 to 10,000;

(IIa)

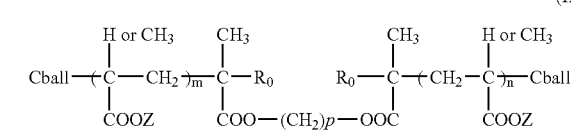

wherein $R_0$, R, Z, and Cball each have the same meaning as in formula (II); and m and n are an integer of 5 to 10,000, respectively;

(IIIa)

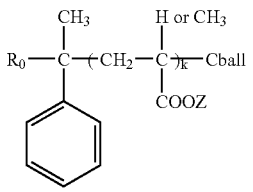

wherein $R_0$, Z, and $C_{ball}$ each have the same meaning as in formula (III); and k is an integer of 10 to 10,000;

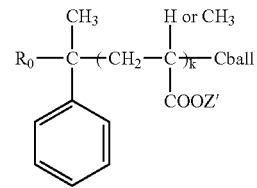
(IIIb)

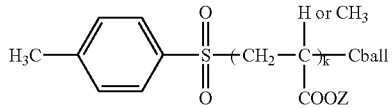
(IVa)

wherein Z and $C_{ball}$ each have the same meaning as in formula (IV); and k is an integer of 10 to 10,000.

A third aspect of the present invention is a method for producing a fullerene-containing polymer comprising: polymerizing a monomer by a living radical polymerization technique to a polymer, wherein the monomer comprises a structure represented by the above formula (0); and reacting the polymer with a fullerene to produce a fullerene-containing polymer, wherein the fullerene-containing polymer is represented by a formula selected from the group consisting of the following formulae (Ib), (IIb), (IIIb) and (IVb):

wherein $R_0$, Z', and $C_{ball}$ each have the same meaning as in formula (III); and k is an integer of 10 to 10,000;

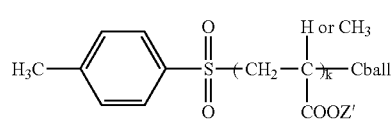
(IVb)

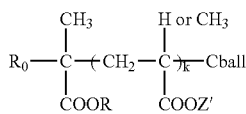
(Ib)

wherein Z' and $C_{ball}$ each have the same meaning as in formula (IV); and k is an integer of 10 to 10,000.

A fourth aspect of the present invention is a method for producing a fullerene-containing polymer comprising: copolymerizing at least a first monomer and a second monomer by a living radical polymerization technique to form a polymer, wherein the first monomer comprises a structure selected from the group consisting of the above structures (i), (ii) and (iii); and reacting the polymer with a fullerene to produce a fullerene-containing polymer, wherein the fullerene-containing polymer is represented by a formula selected from the group consisting of the following formulae (Ic), (IIc), (IIIc) and (IVc):

wherein $R_0$, R, Z', and $C_{ball}$ each have the same meaning as in formula (I); and k is an integer of 10 to 10,000;

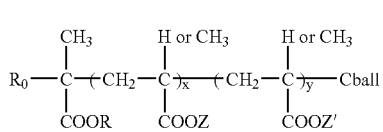
(Ic)

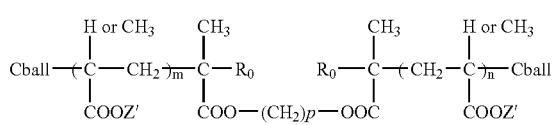
(IIb)

wherein $R_0$, R, Z, Z', and Cball each have the same meaning as in formula (I); x is an integer of 5 to 10,000; and y is an integer of 5 to 10,000;

wherein $R_0$, R, Z', and Cball each have the same meaning as in formula (II); and m and n are an integer of 5 to 10,000, respectively;

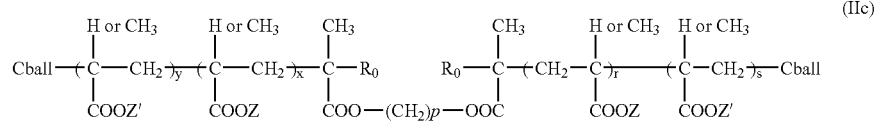
(IIc)

wherein $R_0$, R, Z, Z', and Cball each have the same meaning as in formula (II); x is an integer of 5 to 10,000; y is an integer of 5 to 10,000; r is an integer of 5 to 10,000; and s is an integer of 5 to 10,000;

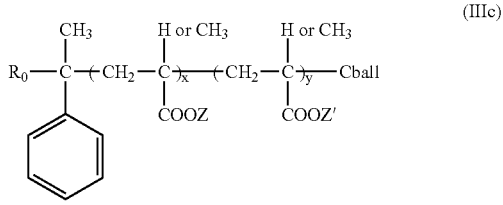
(IIIc)

wherein $R_0$, Z, Z', and $C_{ball}$ each have the same meaning as in formula (III); and x is an integer of 5 to 10,000; and y is an integer of 5 to 10,000;

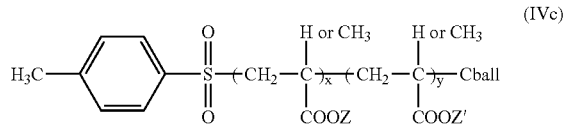
(IVc)

wherein Z, Z', and $C_{ball}$ each have the same meaning as in formula (IV); and x is an integer of 5 to 10,000; and y is an integer of 5 to 10,000.

A fifth aspect of the present invention is a composition comprising a sensitizer and a polymer according to first aspect of the present invention, wherein the composition exhibits photorefractive ability.

A sixth aspect of the present invention is a composition comprising a fullerene-containing polymer obtained by reacting a polymer prepared by living radical polymerization with a fullerene, wherein: (a) the living radical polymerization is carried out using a monomer, a polymerization initiator, transition metal catalyst and a ligand capable of reversibly forming a complex with the transition metal catalyst, (b) the polymer comprises at least one of a first repeat unit including a moiety having charge transport ability and a second repeat unit including a moiety having non-linear-optical ability, and (c) the composition exhibits photorefractive ability. One or both of the photoconductive (charge transport) and non-linear optical components are incorporated into the chemical structure of the polymer itself, typically as side groups.

The polymer differs from photorefractive polymers previously known in the art, because it contains the fullerene group in the polymer chains and is prepared by living radical polymerization, preferably by using a transition metal catalyst.

With respect to the invention point, it was discovered by the inventor that living radical polymerization techniques could be adapted to provide polymers with improved properties for use in photorefractive polymers. Living radical polymerization technique by the inventor makes available to the art a number of innovative features, including use of acrylate-based monomers incorporating charge transport groups and/or non-linear-optical (chromophore) groups, use of transition metal catalyst systems for preparation of photorefractive materials, and use of a monomer incorporating a chromophore precursor group.

DETAILED DESCRIPTION OF THE PREFERRED EMBODIMENT

The photorefractive polymer matrix that is composed of at least fullerene derivatives, along with a component that provides photoconductive or charge transport ability and a component that provides non-linear optical ability. Optionally, the polymer may also include other components as desired, such as plasticizer components.

One or both of the photoconductive and non-linear optical components are incorporated as functional groups into the polymer structure, typically as side groups.

The group that provides the charge transport or photoconductive functionality may be any group known in the art to provide such capability. If this group is to be attached to the polymer matrix as a side chain, then the group should be capable of incorporation into a monomer that can be polymerized to form the polymer matrix of the composition.

Preferred photoconductive groups are phenyl amine derivatives, particularly carbazoles and di-/tri-/tetra-phenyl diamine.

Most preferably the moiety that provides the photoconductive functionality is chosen from the group of phenyl amine derivatives consisting of the following side chain structures (i) to (iii):

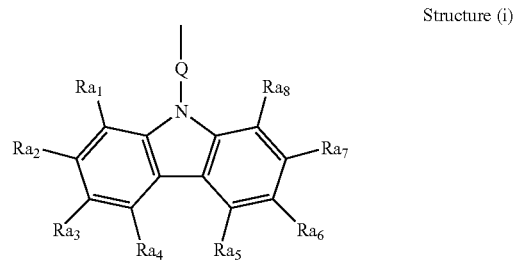
Structure (i)

wherein Q represents an alkylene group, with or without a hetero atom, such as oxygen or sulfur, and preferably Q is an alkylene group represented by $(CH_2)p$; where p is an integer of about 2 to 6; and wherein $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

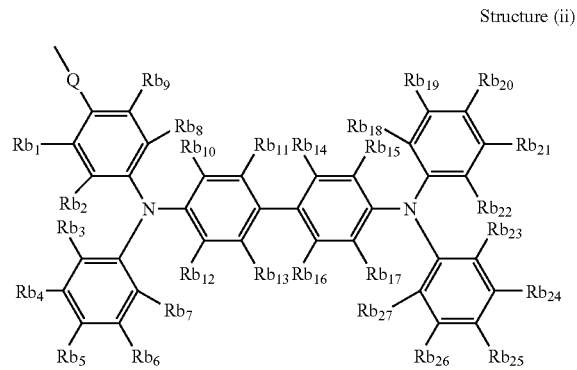
Structure (ii)

wherein Q represents an alkylene group, with or without a hetero atom, such as oxygen or sulfur, and preferably Q is an alkylene group represented by $(CH_2)p$; where p is an integer of about 2 to 6; and wherein $Rb_1$–$Rb_{27}$ are independently selected from the group consisting of a hydrogen atom, a linear alkyl group with up to 10 carbons, a branched alkyl group with up to 10 carbons, and an aromatic group with up to 10 carbons; and Structure (iii)

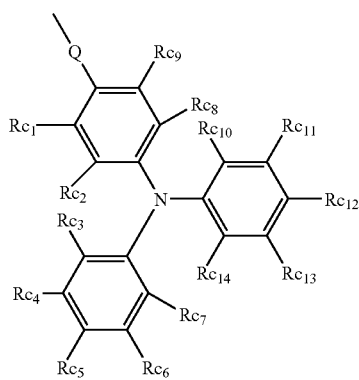

wherein Q represents an alkylene group, with or without a hetero atom, such as oxygen or sulfur, and preferably Q is an alkylene group represented by $(CH_2)p$; where p is an integer of about 2 to 6, and wherein $Rc_1$–$Rc_{14}$ are independently selected from the group consisting of a hydrogen atom, a linear alkyl group with up to 10 carbons, a branched alkyl group with up to 10 carbons, and an aromatic group with up to 10 carbons.

Likewise, the chromophore or group that provides the non-linear optical functionality may be any group known in the art to provide such capability. If this group is to be attached to the polymer matrix as a side chain, then the group, or a precursor of the group, should be capable of incorporation into a monomer that can be polymerized to form the polymer matrix of the composition.

The chromophore or group that provides the non-linear optical functionality used in the present invention is represented by formula (0):

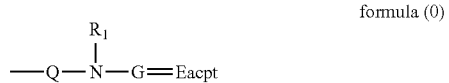

formula (0)

wherein Q represents an alkylene group, with or without a hetero atom; such as oxygen or sulfur, and preferably Q is an alkylene group represented by $(CH_2)p$; where p is an integer of about 2 to 6; $R_1$ is selected from the group consisting of a hydrogen atom, a linear alkyl group with up to 10 carbons, a branched alkyl group with up to 10 carbons, and an aromatic group with up to 10 carbons, and preferably $R_1$ is an alkyl group which is selected from methyl, ethyl, propyl, butyl, pentyl and hexyl; G is a group having a bridge of π-conjugated bond; and Eacpt is an electron acceptor group.

In the above definition, by the term "a bridge of π-conjugated bond", it is meant a molecular fragment that connects 2 to 10 chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

By the term "electron acceptor", it is meant a group of atoms with a high electron affinity that can be bonded to a π-conjugated bridge. Exemplary acceptors, in order of increasing strength, are:

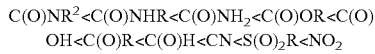

As typical exemplary electron acceptor groups, functional groups which is described in prior of art U.S. Pat. No. 6,267,913 and shown in the following structure figure can be used.

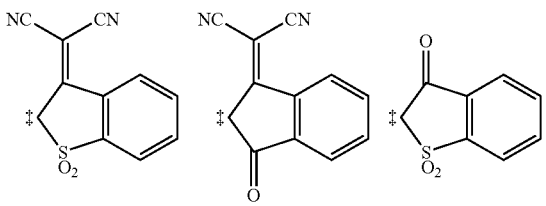

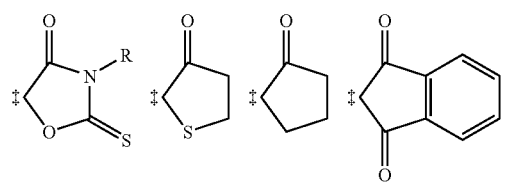

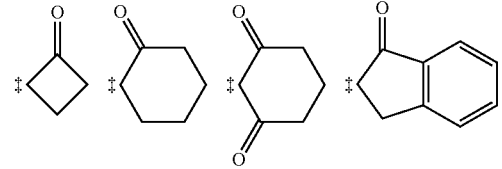

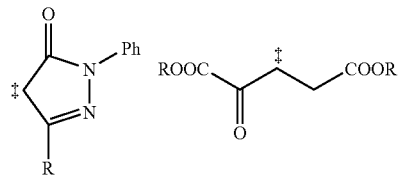

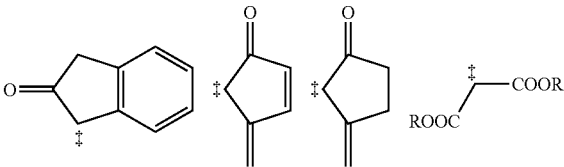

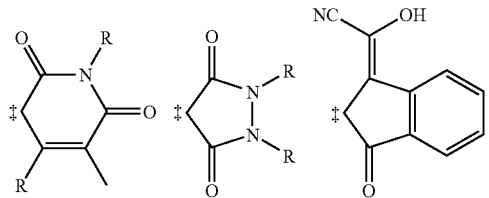

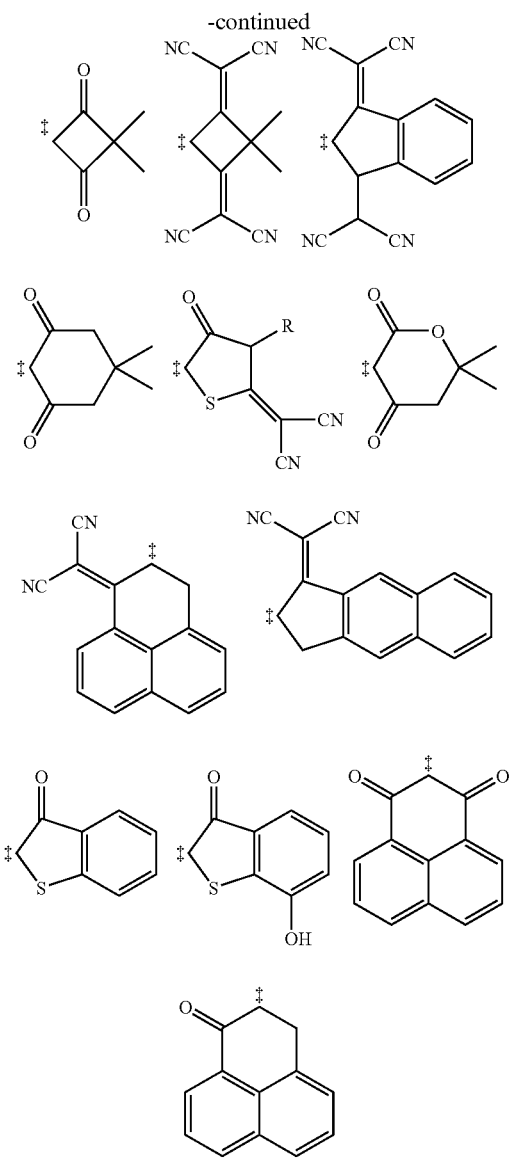

wherein R is selected from the group consisting of a hydrogen atom, a linear alkyl group with up to 10 atoms, a branched alkyl group with up to 10 atoms, and an aromatic group with up to 10 carbons.

Preferred chromophore groups are aniline-type groups or dehydronaphtyl amine groups.

Most preferably the moiety that provides the non-linear optical functionality is such a case that G in formula (0) is represented by a structure selected from the group consisting of the structures (iv), (v) and (vi);

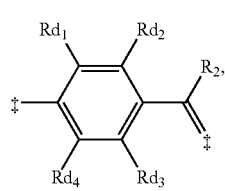

Structure (iv)

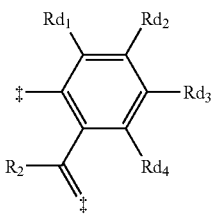

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons, and preferably $Rd_1$–$Rd_4$ are all hydrogen; $R_2$ is selected from the group consisting of a hydrogen atom, a linear alkyl group with up to 10 atoms, a branched alkyl group with up to 10 atoms, and an aromatic group with up to 10 carbons;

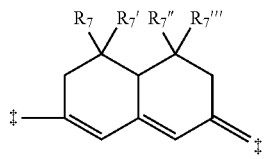

Structure (vi)

wherein $R_7$, $R_7'$, $R_7''$, and $R_7'''$ each independently represent hydrogen or a linear or branched alkyl group with up to 10 carbons; and wherein Eacpt in formula (0) is an electron acceptor group and represented by a structure selected from the group consisting of the structures;

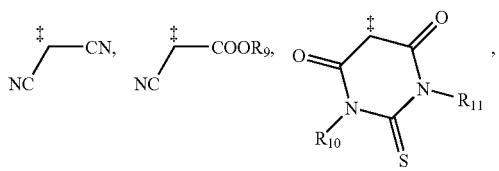

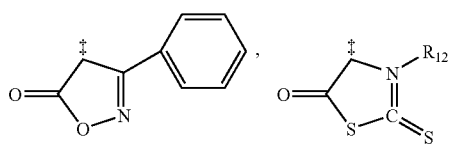

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

A preferred polymer used for the photorefractive composition is the following formulae (Ia), (IIa), (IIIa), (IVa), (Ib), (IIb), (IIIb), (IVb), (Ic), (IIc), (IIIc) and (IV):

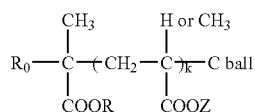

wherein $R_0$, R, Z and C ball each have the same meaning as in formula (I); and k is an integer of 10 to 10,000;

(IIa)

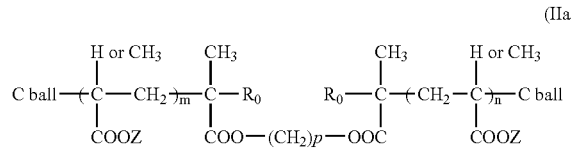

wherein $R_0$, R, Z and C ball each have the same meaning as in formula (I); and m and n are an integer of 5 to 10,000, respectively;

(IIIa)

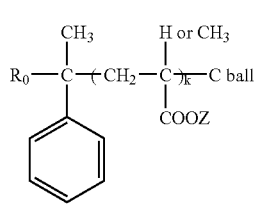

wherein $R_0$, Z and C ball each have the same meaning as in formula (I); and k is an integer of 10 to 10,000;

(IVa)

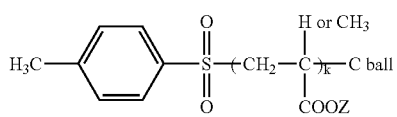

wherein Z and C ball each have the same meaning as in formula (I); and k is an integer of 10 to 10,000;

(Ib)

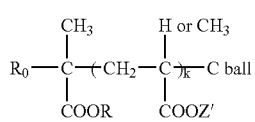

(Ia)

wherein $R_0$, R, Z' and C ball each have the same meaning as in formula (I); and k is an integer of 10 to 10,000;

(IIb)

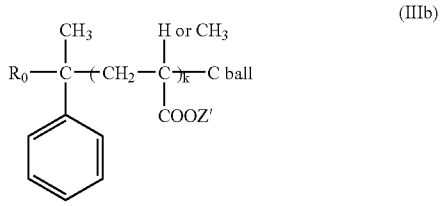

wherein $R_0$, R, Z' and C ball each have the same meaning as in formula (I); and m and n are an integer of 5 to 10,000, respectively;

(IIIb)

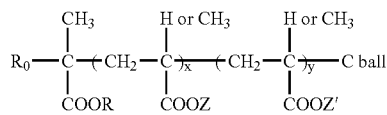

wherein $R_0$, Z' and Cball each have the same meaning as in formula (I); and k is an integer of 10 to 10,000;

(IVb)

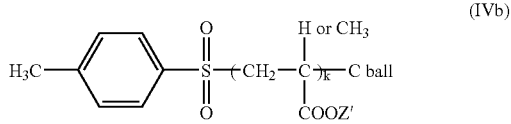

wherein Z' and Cball each have the same meaning as in formula (I); and k is an integer of 10 to 10,000;

(Ic)

wherein $R_0$, R, Z, Z' and Cball each have the same meaning as in formula (I); x is an integer of 5 to 10,000; and y is an integer of 5 to 10,000;

(IIc)

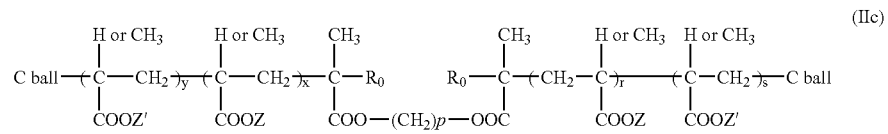

wherein $R_0$, R, Z, Z' and Cball each have are the same meaning as in formula (I); x is an integer of 5 to 10,000; y is an integer of 5 to 10,000; r is an integer of 5 to 10,000; and s is an integer of 5 to 10,000;

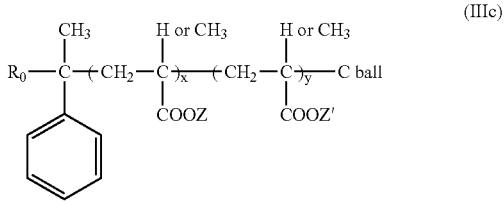
(IIIc)

wherein $R_0$, Z, Z' and Cball each have the same meaning as in formula (I); and x is an integer of 5 to 10,000; and y is an integer of 5 to 10,000;

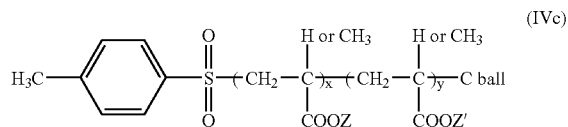
(IVc)

wherein Z, Z' and Cball each have the same meaning as in formula (I); and x is an integer of 5 to 10,000; and y is an integer of 5 to 10,000.

The polymer matrix is preferably synthesized from a monomer incorporating at least one of the above photoconductive groups or one of the above chromophore groups. The inventor has recognized that a number of physical and chemical properties are desirable in the polymer matrix. It is preferred if the polymer itself incorporates both a charge transport group and a chromophore group, so the ability of the monomer units to form copolymers is preferred. Physical properties of the formed polymer that are of importance are the molecular weight and the glass transition temperature, Tg. Also, it is valuable and desirable, although not essential, that the polymer should be capable of being formed into films, coatings and shaped bodies of various kinds by standard polymer processing techniques, such as solvent coating, injection molding and extrusion.

In the present invention, the polymer generally has a weight average molecular weight, Mw, of from about 3,000 to 500,000, preferably from about 5,000 to 100,000. The term "weight average molecular weight" as used herein means the value determined by the GPC (gel permeation chromatography) method in polystyrene standards, as is well known in the art.

For good photorefractive properties, the photorefractive composition should be substantially amorphous and non-crystalline or non-glassy under the conditions of use. Therefore, it is preferred that the finished photorefractive composition has a relatively low glass transition temperature, Tg, such as below about 50° C., more preferably below about 40° C. Preferred temperature ranges for the Tg are 10–50° C., most preferably 20–40° C. If the pure polymer itself has a glass transition temperature higher than these preferred values, which will generally be the case, components may be added to lower the Tg, as discussed in more detail below.

Nevertheless, it is preferred that the polymer itself has a relatively low glass transition temperature, by which the inventors mean a Tg no higher than about 125° C., more preferably no higher than about 120° C., and most preferably no higher than about 110° C. or 100° C.

A relatively low glass transition temperature is preferred because the greater mobility of polymer chains that polymers exhibit close to or above their glass transition temperature gives higher orientation during voltage application, and leads to better performance, such as high photoconductivity, fast response time and high diffraction efficiency, of the photorefractive device.

In principle, as the polymer backbone matrices of the invention, including, any polymer chain can be used as long as the corresponding monomers can be polymerized by living radical polymerization method.

Preferred types of backbone units are those based on (meth)acrylates or styrene. Particularly preferred are methacrylate-based monomers, and most preferred are acrylate monomers. The first polymeric materials to include photoconductive functionality in the polymer itself were the polyvinyl carbazole materials developed at the University of Arizona. However, these polyvinyl carbazole polymers tend to become viscous and sticky when subjected to the heat-processing methods typically used to form the polymer into films or other shapes for use in photorefractive devices.

In contrast, preferred materials of the present invention, and particularly the (meth)acrylate-based, and more specifically methacrylate-based, polymers, have much better thermal and mechanical properties. That is, they provide better workability during processing by injection-molding or extrusion, for example. This is particularly true when the polymers are prepared by living radical polymerization, as described below, since this method yields a polymer product of lower viscosity than would be the case for the same polymer prepared by other methods.

Particular examples of monomers including a phenyl amine derivative group as the charge transport component are carbazolylpropyl (meth)acrylate monomer; 4-(N,N-diphenylamino)-phenylpropyl(meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(3-methylphenyl)-(1,1'-biphenyl)-4,4'-diamine; and N-[(meth)acroyloxypropylphenyl]-N'-phenyl-N, N'-di(4-buthoxyphenyl)-(1,1'-biphenyl)-4,4'-diamine. Such monomers can be used singly or in mixtures of two or more monomers.

Particular examples of monomers including a chromophore group as the non-linear optical component are N-ethyl, N-4-dicyanomethylidenyl acrylate and N-ethyl, N-4-dicyanomethylidenyl-3,4,5,6,10-pentahydronaphtyl-pentyl acrylate.

In light of the desired features, the inventor has recognized that the recently developed polymerization technique known as living radical polymerization has the potential for preparing polymers with unusually good photorefractive properties. In particular, living radical polymerization has the potential to form polymers with unusually low polydispersity, such as less than 2.5, preferably less than 2.0. Living radical polymerization can also be used to form random copolymers and block copolymers, as discussed in more detail below.

Diverse polymerization techniques are known in the art. One such technique is radical polymerization, which is typically carried out by using an azo-type initiator, such as AIBN (azoisobutyl nitrile).

In conventional radical polymerization, the polymer growth terminal is in the active radical state, so it is easy for unwanted side reactions to occur, such as bimolecular coupling or disproportionation, generally making it difficult to achieve precise control of polymerization. As a result, this technique is not attractive for preparing photorefractive polymer materials.

On the other hand, as stated above, living radical polymerization is a new technique that offers the opportunity to prepare polymers with properties tailored to achieve improved photorefractive capability. Living radical polymerization differs from conventional radical polymerization in that the polymer growth terminals are temporarily protected by protection bonding. Through reversibly and radically severing this bond, it is possible to control and facilitate the growth of polymer molecules. For example, in a polymerization reaction, an initial supply of monomer can be completely consumed and growth can be temporarily suspended. However, by adding another monomer of the same or different structure, it is possible to restart polymerization. Therefore, the position of functional groups within the polymer can be controlled.

Although various polymerization techniques are known to the art and may be used in the invention, it is preferred, therefore, to prepare the polymer matrix materials of the invention by living radical polymerization, and the inventor has developed customized procedures for so doing.

Details of the living radical polymerization method are described in the literature. They may be found, for example, in the following papers:

T. Patten et al., "Radical polymerization yielding polymers with Mw/Mn~1.05 by homogeneous atom transfer radical polymerization", *Polymer Preprints*, 1996, 37, 575.

K. Matyjasewski et al., "Controlled/living radical polymerization. Halogen atom transfer radical polymerization promoted by a Cu(I)/Cu(II) redox process", *Macromolecules*, 1995, 28, 7901.

M. Sawamoto et al., "Ruthenium-mediated living radical polymerization of methyl methacrylate", *Macromolecules*, 1996, 29, 1070.

Living radical polymerization is also described at length in U.S. Pat. No. 5,807,937 to Carnegie-Mellon University, which is incorporated herein by reference in its entirety.

Briefly, living radical polymerization technique of the invention involves the use of a polymerization initiator, transition metal catalyst and a ligand (an activating agent) capable of reversibly forming a complex with the transition metal catalyst.

The polymerization initiator is typically a halogen-containing organic compounds. After polymerization, this initiator or components of the initiator are attached to the polymer at both polymer terminals. The polymerization initiator preferably used is an ester-based or styrene-based derivative containing a halogen in the α-position.

The polymerization initiator is preferably shown by the following formula (I″), (II″) or (III″).

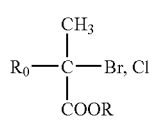

formula (I″)

wherein $R_0$ represents a hydrogen atom or alkyl group with up to 10 carbons; and R is selected from the group consisting of a hydrogen atom, a linear alkyl group with up to 10 carbons, a branched alkyl group with up to 10 carbons, and an aromatic group with up to 10 carbons;

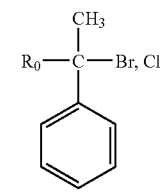

formula (II″)

wherein $R_0$ represents a hydrogen atom or alkyl group with up to 10 carbons.

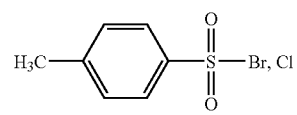

formula (III″)

Particularly preferred are 2-bromo(or chloro)methylpropionic acid, or bromo(or chloro)-1-phenyl derivatives. Specific examples of these derivatives include ethyl 2-bromo(or chloro)-2-methylpropionate, ethyl 2-bromo(or chloro)propionate, 2-hydroxyethyl 2-bromo(or chloro)-2-methylpropionate, 2-hydroxyethyl 2-bromo(or chloro)propionate, and 1-phenyl ethyl bromide(chloride).

Instead of a mono bromo(chloro) type initiator, a dibromo(chloro) type initiator, such as dibromo(chloro) ester derivative, can be used. Such initiators are represented by the formula (IV″):

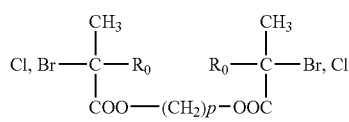

formula (IV″)

wherein $R_0$ represents independently a hydrogen atom or alkyl group with up to 10 carbons; and p is 2 to 6.

Of these initiators, most preferred is ethylene bis(2-bromo (chloro)-2-methylpropionate). By using this initiator, the inventor has discovered that block copolymers, and particularly A-B-A type or B-A-B type block copolymers, can be produced very efficiently.

In the process of the invention, the polymerization initiator is generally used in an amount of from 0.01 to 20 mol %, preferably from 0.1 to 10 mol %, and more preferably from 0.2 to 5 mol %, per mole of the sum of the polymerizable monomers.

Various types of catalysts are known, including perfluoroalkyl iodide type, TEMPO (phenylethoxy-tetramethylpiperidine) type, and transition metal type. The inventor has discovered that high-quality polymers can be made by using transition-metal catalysts, which are safer, simpler, and more amenable to industrial-scale operation than TEMPO-type catalysts. Therefore, in the process of the invention a transition-metal catalyst is preferred.

Non-limiting examples of transition metals that may be used include Cu, Ru, Fe, Rh, V, and Ni. Particularly preferred is Cu. Typically, but not necessarily, the transition metal is used in the form of the metal halide (chloride, bromide, etc.).

The transition metal in the form of a halide or the like is generally used in the amount of from 0.01 to 3 moles, and preferably from 0.1 to 1 mole, per mole of polymerization initiator.

The activating agent (ligand) is an organic ligand of the type known in the art that can be reversibly coordinated with the transition metal as a center to form a complex. The ligand preferably used is a bipyridine derivative, mercaptans derivative, trifluorate derivative, or the like. When complexed with the activating ligand, the transition metal catalyst is rendered soluble in the polymerization solvent. In other words, the activating agent serves as a co-catalyst to activate the catalyst, and start the polymerization.

The ligand is used in an amount of normally from 1 to 5 moles, and preferably from 2 to 3 moles, per mole of transition metal halide.

The use of the polymerization initiator and the activating agent in the above recommended proportions makes it possible to provide good results in terms of the reactivity of the living radical polymerization and the molecular weight and weight distribution of the resulting polymer.

In the present invention, living radical polymerization can be carried out without a solvent or in the presence of a solvent, such as butyl acetate, toluene or xylene.

To initiate the polymerization process, the monomer(s), polymerization initiator, transition metal catalyst, activating agent and solvent are introduced into the reaction vessel. As the process starts, the catalyst and initiator form a radical, which attacks the monomer and starts the polymerization growth.

The living radical polymerization is preferably carried out at a temperature of from about 70° C. to 130° C., and is allowed to continue for about 1 to 100 hours, depending on the desired final molecular weight and polymerization temperature, and taking into account the polymerization rate and deactivation of catalyst.

By carrying out the living radical polymerization technique based on the teachings and preferences given above, it is possible to prepare homopolymers carrying charge transport or non-linear optical groups, as well as random or block copolymers carrying both charge transport and non-linear optical groups. It is possible to prepare such materials with exceptionally good properties, such as response time and diffraction efficiency.

If the polymer is made from monomers that provide only charge transport ability, the photorefractive composition of the invention can be made by dispersing a component that possesses non-linear optical properties through the polymer matrix, as is described in U.S. Pat. No. 5,064,264 to IBM, which is incorporated herein by reference. Suitable materials are known in the art and are well described in the literature, such as in D. S. Chemla & J. Zyss, "Nonlinear Optical Properties of Organic Molecules and Crystals" (Academic Press, 1987). Also, as described in U.S. Pat. No. 6,090,332 to Seth R. Marder et. al., fused ring bridge, ring locked chromophores that form thermally stable photorefractive compositions can be used. For typical, non-limiting examples of chromophore additives, the following chemical structure compounds can be used:

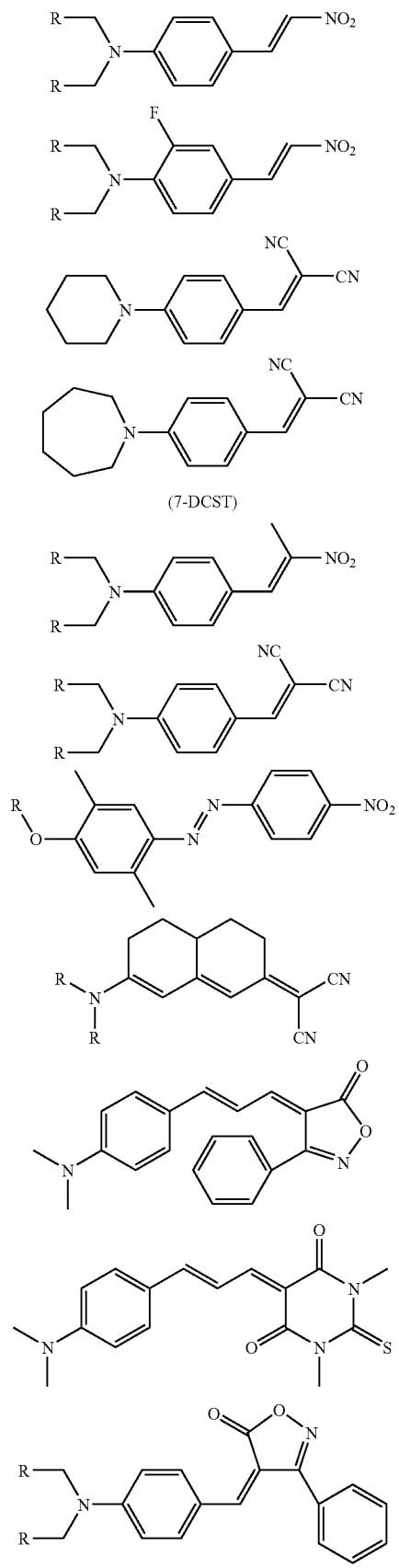

-continued

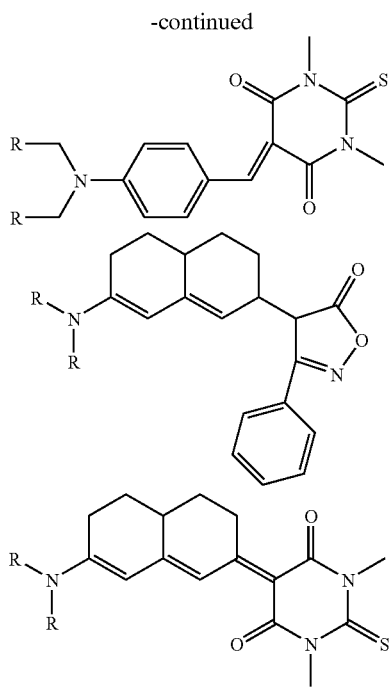

The chosen compound(s) is usually mixed in the matrix charge transport homopolymer in a concentration of about 1–80 wt %, more preferably 5–50 wt %.

On the other hand, if the polymer is made from monomers that provide only non-linear optical ability, the photorefractive composition of the invention can be made by mixing a component that possesses charge transport properties into the polymer matrix, again as is described in U.S. Pat. No. 5,064,264 to IBM. Preferred charge transport compounds are good hole transfer compounds, for example N-alkyl carbazole or triphenylamine derivatives.

As an alternative, or in addition, to adding the charge transport component in the form of a dispersion of entities comprising individual molecules with charge transport capability, a polymer blend can be made of individual polymers with charge transport and non-linear optical abilities. For the charge transport polymer, the polymers already described above, such as containing phenyl-amine derivative side chains, can be used. Since polymers containing only charge transport groups are comparatively easy to prepare by conventional techniques, the charge transport polymer may be made by living radical polymerization or by any other convenient method.

To prepare the non-linear optical polymer itself, monomers that have side-chain groups possessing non-linear-optical ability should be used. Non-limiting examples of monomers that may be used are those containing the following chemical structures:

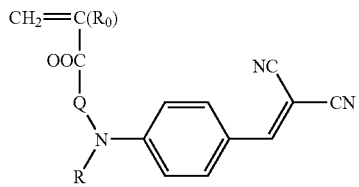

-continued

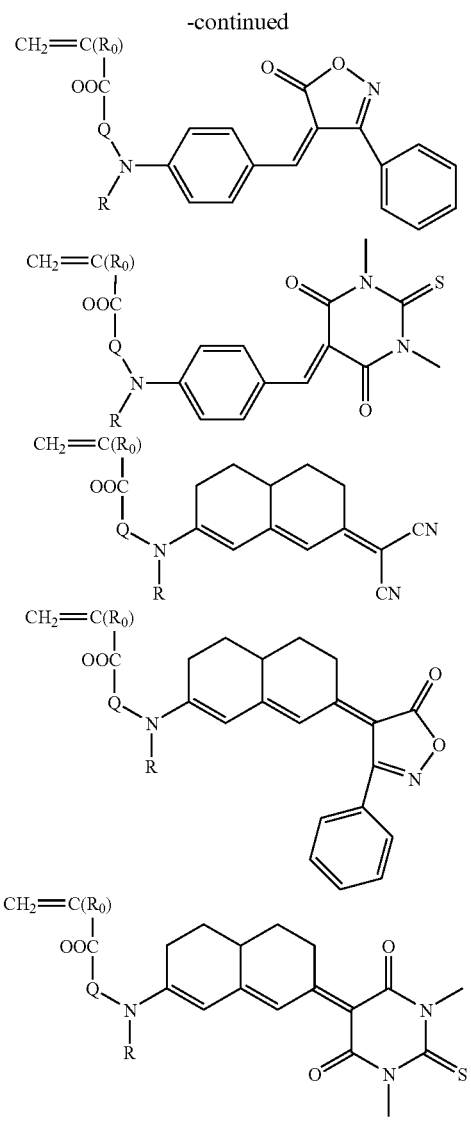

wherein Q represents an alkylene group with or without a hetero atom, such as oxygen or sulfur, and preferably Q is an alkylene group represented by $(CH_2)p$; where p is of about 2 to 6; $R_0$ is a hydrogen atom or methyl group, and R is a linear or branched alkyl group with up to 10 carbons; and preferably R is an alkyl group which is selected from methyl, ethyl, and propyl.

The inventor has discovered a new technique for preparing such polymers. The technique involves the use of a precursor monomer containing a precursor functional group for non-linear optical ability. Typically, this precursor is represented by the general formula:

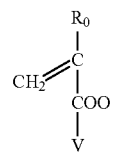

wherein $R_0$ is a hydrogen atom or methyl group, and V is selected from the group consisting of the following structures 1 to 3:

Structure 1

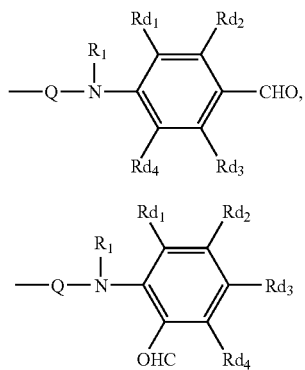

Structure 2 wherein, in both structures 1 and 2, Q represents an alkylene group, with or without a hetero atom, such as oxygen or sulfur, and preferably Q is an alkylene group represented by $(CH_2)p$; where p is of about 2 to 6; and wherein $Rd_1$–$Rd_4$ are independently selected from the group consisting of a hydrogen atom, a linear alkyl group with up to 10 carbons, a branched alkyl group with up to 10 atoms, and an aromatic group with up to 10 carbons, and preferably $Rd_1$–$Rd_4$ are hydrogen; and wherein $R_1$ represents a linear or branched alkyl group with up to 10 carbons, and preferably $R_1$ is an alkyl group selected from methyl, ethyl, propyl, butyl, pentyl and hexyls; and Structure 3

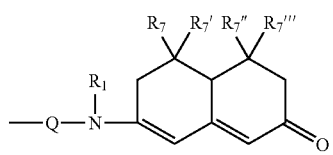

wherein Q represents an alkylene group, with or without a hetero atom, such as oxygen or sulfur, and preferably Q is an alkylene group represented by $(CH_2)p$; where p is of about 2 to 6; and wherein $R_1$ represents a linear or branched alkyl group with up to 10 carbons, and preferably $R_1$ is an alkyl group selected from methyl, ethyl, propyl, butyl, pentyl and hexyls; and wherein $R_7$, $R_7'$, $R_7''$, and $R_7'''$ each independently represent hydrogen or a linear or branched alkyl group with up to 10 carbons.

After the precursor polymer has been formed, it can be converted into the corresponding polymer having non-linear optical groups and capabilities by a condensation reaction. Typically, the condensation reagent may be selected from the group consisting of

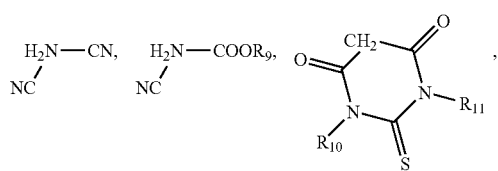

-continued

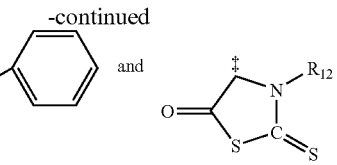

wherein $R_9$, $R_{10}$, $R_{11}$ and $R_{12}$ are independently selected from the group consisting of a hydrogen atom, a linear alkyl group with up to 10 carbons, a branched alkyl group with up to 10 carbons, and an aromatic group with up to 10 carbons.

The condensation reaction can be done at room temperature for 1–100 hrs, in the presence of a pyridine derivative catalyst. A solvent, such as butyl acetate, chloroform, dichloromethylene, toluene or xylene can be used. Optionally, the reaction may be carried out without the catalyst at a solvent reflux temperature of 30° C. or above for about 1–100 hours.

The inventor has discovered that use of a monomer containing a precursor group for non-linear-optical ability, and conversion of that group after polymerization tends to result in a polymer product of lower polydispersity than the case if a monomer containing the non-linear-optical group is used. This is, therefore, preferred technique by the invention.

To prepare copolymers, both the non-linear-optical monomer and the charge transport monomer, each of which can be selected from the types mentioned above, should be used.

There are no restrictions on the ratio of monomer units. However, as a typical representative example, the ratio of [a (meth)acrylic monomer having charge transport ability]/[a (meth)acrylate monomer having non-linear optical ability] is between about 4/1 and 1/4 by weight. More preferably, the ratio is between about 2/1 and 1/2 by weight. If this ratio is less than about 1/4, the charge transport ability is weak, and the response time tends to be too slow to give good photorefractivity. On the other hand, if this ratio is more than about 4/1, the non-linear-optical ability is weak, and the diffraction efficiency tends to be too low to give good photorefractivity.

In the living radical polymerization method of the invention, the monomer addition sequence is important for achieving the desired copolymer structure. For example, to make random copolymers, both the chromophore-containing and the charge-transport-group-containing monomers can be added at the same time.

However, by adding the monomers sequentially, block type copolymers can be prepared. For example, to prepare an A-B type block copolymer, wherein polymer block A has charge transport ability and polymer block B has non-linear-optical ability, firstly the monomer having charge transport ability is polymerized, preferably by using a mono bromo (chloro) type initiator. Subsequently, the second monomer having non-linear-optical ability is added to continue the polymerization. In this way, an A-B type block copolymer can be produced. During this polymerization procedure, the second monomer is added at the time when the first monomer is polymerized more than 50% by weight, normally 70% by weight or more, preferably 80% by weight or more, and more preferably 90% by weight or more.

On the other hand, if the monomer having non-linear-optical ability is polymerized first, a B-A type block copolymer can be produced. Similarly to the above polymerization procedure, the second monomer is added at the time when the first monomer is polymerized more than 50% by weight, normally 70% by weight or more, preferably 80% by weight or more, and more preferably 90% by weight or more.

Further, if living radical polymerization is carried out in a manner such that, first, the monomer having charge transport ability is polymerized, then the second monomer having non-linear-optical ability is added to continue polymerization, and thirdly an additional amount of the monomer having charge transport ability is added to continue polymerization, an A-B-A type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

Moreover, if the above three-stage polymerization is followed by the addition of the another monomer to continue the polymerization of monomers, an A-B-A-B type block copolymer can be produced. From the above explanation, it will be apparent to those of skill in the art that the new methods that the inventor has developed can be used, by changing the sequence of monomer addition, to produce block copolymers of any desired type, including, but not limited to B-A-B, B-A-B-A, B-A-B-A-B-A, or A-B-A-B-A type block copolymers.

If the copolymer constitutes two or more of polymer blocks A, the A-type constituting blocks need not necessarily be prepared from the same monomer. Likewise, if the copolymer constitutes two or more of polymer blocks B, the B-type blocks need not necessarily be prepared from the same monomer. Thus, the individual blocks may be of different forms represented by A1, A2, A3, etc. and B1, B2, B3 etc. In this way, a large diversity of polymers, such as A1-B-A2, B1-B2-A, or A1-B1-A2-B2 can be produced.

Optionally, other components may be added to the polymer matrix to provide or improve the desired physical properties mentioned earlier in this section. As mentioned above, it is preferred that the polymer matrix has a relatively low glass-transition temperature, and be workable by conventional processing techniques. Optionally, a plasticizer may be added to the composition to reduce the glass transition temperature and/or facilitate workability. The type of plasticizer suitable for use in the invention is not restricted; many such materials will be familiar to those of skill in the art. Representative typical examples include N-alkylcarbazole and dioctylphthalate. Oligomer-type compounds of the charge transport or non-linear-optical monomers may also be used to control the Tg of the composition.

In general, the smallest amount of plasticizer required to provide a suitable overall Tg for the composition should be used. Compositions with large amounts of plasticizer tend to have lower stability, as the polymer matrix and the plasticizer may phase separate over time. Also, the photorefractive properties of the material are diminished by dilution of the active components by the plasticizer.

As discussed above, the invention provides polymers of comparatively low Tg when compared with similar polymers prepared in accordance with prior art methods. The inventor has recognized that this provides a benefit in terms of lower dependence on plasticizers. By selecting polymers of intrinsically moderate Tg and by using methods that tend to depress the average Tg, it is possible to limit the amount of plasticizer required for the composition to preferably no more than about 30% or 25%, and more preferably lower, such as no more than about 20%.

Yet another method to adjust the Tg or improve film formation ability, for example, is to add another monomer, such as an acrylic or methacrylic acid alkyl ester, as a modifying co-monomer. Examples of modifying co-monomers are $CH_2=CR_0-COOR$ wherein $R_0$ represents a hydrogen atom or methyl group, and R represents a $C_{2-14}$alkyl group, such as butylacrylate, ethyl acrylate, propyl acrylate, 2-ethylhexyl (meth)acrylate and hexyl (meth) acrylate.

Like mentioned above, the inventor has already found the effectiveness and advantage for using the living radical polymerization.

On the other hand, as one of most important factors, by using the living radical polymerization technique, novel type of (co)polymer, which contain fullerene group at polymer terminal position can be prepared.

The only example known to the inventor of fullerene-containing polymer preparation by living radical polymerization is in a paper by F. M. Li et.al. (*Macromolecules*, 2000, 33, 1948). This reference discloses the polymerization of a $C_{60}$ fullerene-containing styrene monomer, using a copper halide catalysis. This citation gave us only example of styrene polymers. No photorefractive or electro-optical performance data are reported in the citation.

In the F. M. Li et. al., after getting polystyrene by the living radical polymerization technique, the fullerene addition at last stage gave the corresponding fullerene-containing (co)polymers. Before the addition of fullerene, polymer purification is not required and fullerene atom(s) can be attached at the polymer terminal position with living radical catalysis.

Under this circumstance, the inventor found a useful and easy synthetic method for the fullerene-containing polymer by using living radical polymerization method. Furthermore, the fullerene-containing polymer showed very good photorefractivity, since the fullerene is well-known good photosensitizer. The photorefractive materials of the invention provide combinations of desirable properties not previously available to the art.

Fullerene used in the present invention is selected from the class of fullerences, which includes derivatives of the fullerenes. For example, $C_{60}$, $C_{70}$, $C_{76}$, $C_{78}$, and $C_{84}$ are exemplified as fullerenes. Furthermore, chemically modified derivatives are also belong to a class material of fullerene. The soccer-ball-shaped molecules possess three-dimensional p-delocalized electrons, a property that gives rise to a large nonresonant, instantaneous response.

Fullerene atom(s) can be attached at the polymer terminal position by an addition reaction. In the addition reaction, transition metal catalysts, activating agents (ligand), and solvents as described above can be used.

A particularly advantageous feature is the good phase stability of the composition. Unlike prior arts inventions, the fullerene, which works as photosensitizer, is incorporating into the polymer chain. Therefore, the fullerene part is not clustered out or phase separated from the matrix polymer. Usually, low molecular weight additive fullerene has low solubility into other materials and easy tendencies to be clustered out. This behavior resulted in low transmittance of laser light or easy breakdown tendency while applying high voltage on performance measurement. However, the polymers of the invention contain the fullerene part in their polymer chains and no chance to be clustered out. Therefore, the polymers of the invention possess superior transmittance and durability. These are most important feature.

Another advantageous feature is the fast response time. Response time is the time for building up of the diffraction grating in the photorefractive material when exposed to a laser writing beam. The response time of a sample of material may be measured by transient four-wave mixing (TFWM) experiments, as detailed in the Examples section below. The data may then be fitted with the following bi-exponential function:

$$\eta(t)=A\sin^2[B(1-a_1e^{-t/J_1}-a_2e^{-t/J_2})]$$

with $$a_1+a_2=1$$

where $\eta(t)$ is the diffraction efficiency at time t, and A, B, $a_1$, and $a_2$ are fitting parameters, $J_1$ and $J_2$ are the grating build-up times. Between $J_1$ and $J_2$, the smaller number is defined as the response time.

Response time is important because the faster response time means faster grating build-up, which enables the photorefractive composition to be used for wider applications, such as real-time hologram applications.

Typical response times for known photorefractive materials range from seconds to sub-seconds. Times longer than 100 ms are common. To the inventor's knowledge, the fastest response time reported so far is 4 msec., which was reported by N. Peyghambarian et al. (*J. Mater. Chem.*, 1999, 9, 2251). However, in order to get this fast speed, a high biased voltage (95V/μm) is required. Such a high biased voltage may be difficult in an industrial, rather than a laboratory, environment. Also, this response time was achieved in a composition that used a polyvinyl carbazole polymer, and such polymers become sticky and difficult to handle during heat processing. In contrast, the methacrylate-based, or more specifically acrylate-based polymers, that are preferred herein provide excellent workability during heat processing and other polymer handling methods.

In comparison with typical prior art materials, the photorefractive compositions of the invention provide good response times, such as no more than about 50 ms, and preferably faster, such as no more than about 40 ms, no more than about 35 ms, or no more than about 30 ms.

Yet another advantageous feature is the diffraction efficiency. Diffraction efficiency is defined as the ratio of the intensity of the diffracted beam to the intensity of the incident probe beam, and is determined by measuring the intensities of the respective beams. Obviously, the closer to 100% is the ratio, the more efficient is the device.

In general, for a given photorefractive composition, a higher diffraction efficiency can be achieved by increasing the applied bias voltage.

In comparison with typical prior art materials, the photorefractive compositions of the invention provide good diffraction efficiencies.

Also, with regard to phase stability, in comparison with typical prior art materials, the photorefractive compositions of the invention provide good phase stability. This invention material can be observed no phase separation or some component crystallization, even high temperature storage. These phase separation or some component crystallization are disadvantage, because composition give low transmittance of laser beams which means low photorefractivities.

In this case, high temperature storage means the temperature is at 60° C.

Usually the higher storage temperature for photorefrative composition can enhance speed of composition deterioration, phase separation, or composition crystallization. From standpoint of general application view, the stability of samples is important and said to require having at least 3 months at 60° C. which is said to correspond to 3 years at 20° C.

The invention is now further described by the following examples, which are intended to be illustrative of the invention, but are not intended to limit the scope or underlying principles in any way.

EXAMPLES

Production Example 1

(a) Monomers Containing Charge Transport Groups

A triphenyl diamine type (N-[acroyloxypropylphenyl]-N, N',N'-triphenyl-(1,1'-biphenyl)-4,4'-diamine) (TPD acrylate, the following structure) was purchased from Fuji Chemical, Japan:

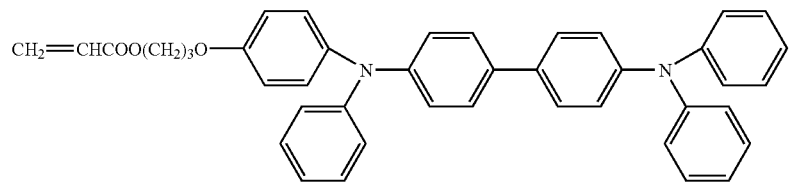

TPD acrylate monomer was prepared by the following procedure.

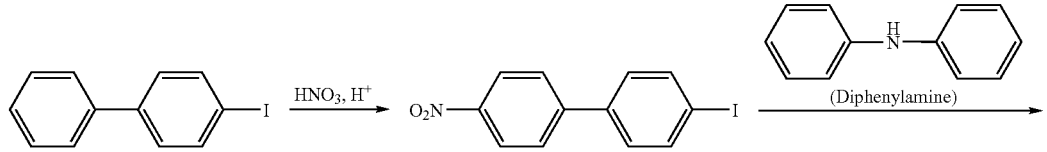

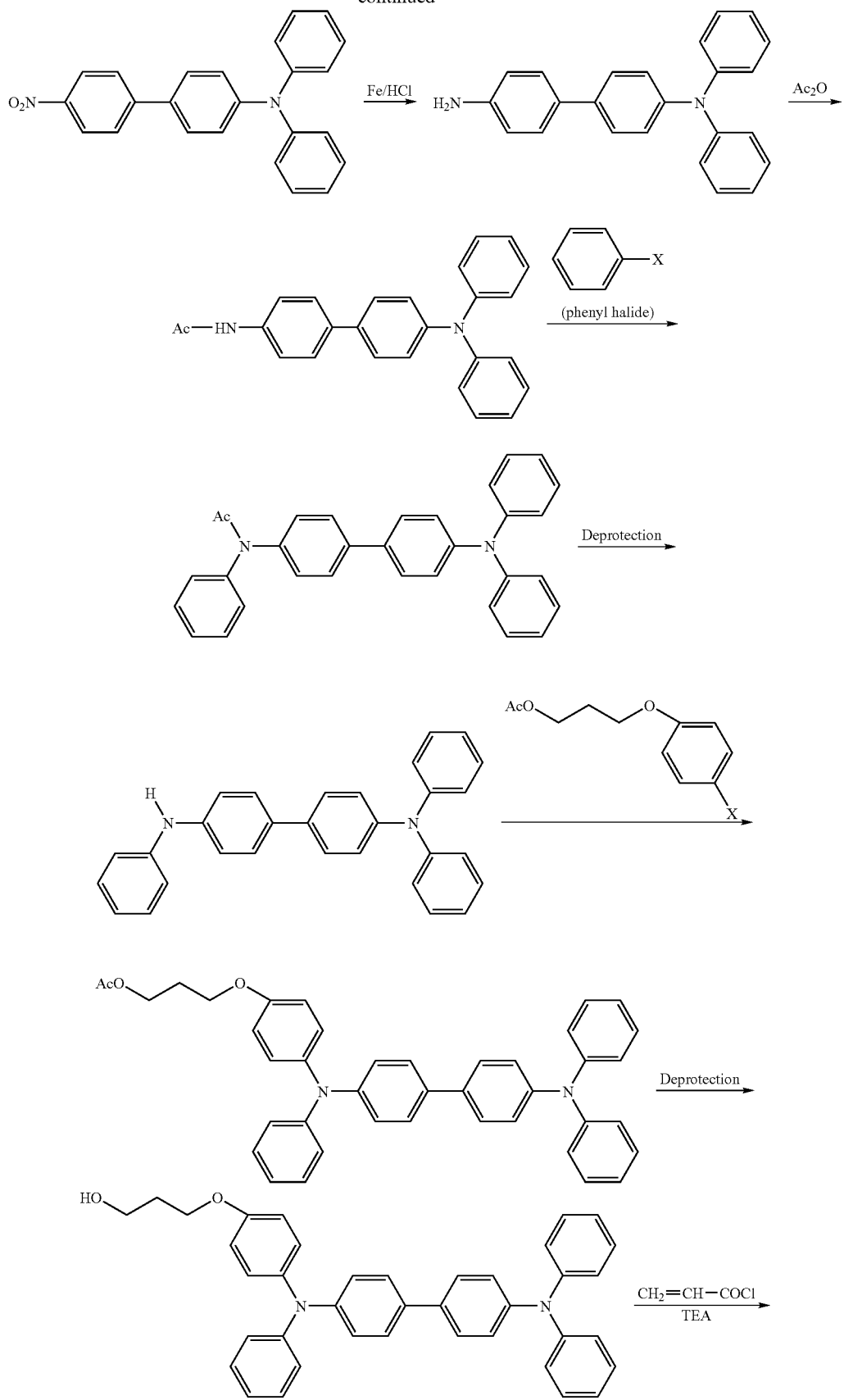

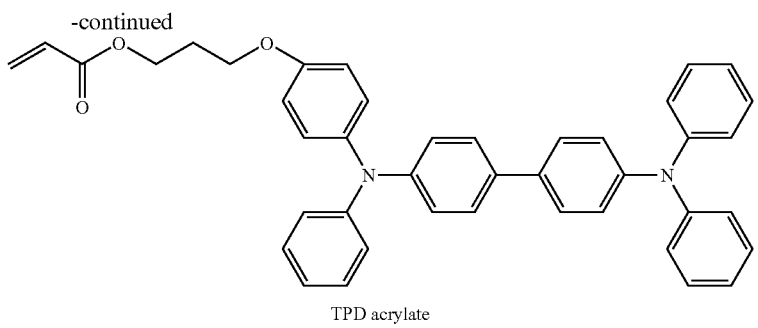

TPD acrylate

In the above procedure, usage of 3-methyl diphenylamine instead of diphenylamine and 3-methylphenyl halide instead of phenyl halide can result in the formation of N(acroyloxypropylphenyl)-N'-phenyl-N,N'-di(3-methylphenyl)-(1,1'-biphenyl)-4,4'-diamine.

b) Synthesis of a Plascticizer TPD-Ac

The plasticizer TPD-Ac was synthesized from the same intermediate which was used for TPD acrylate synthesis according to the following one-step synthesis scheme:

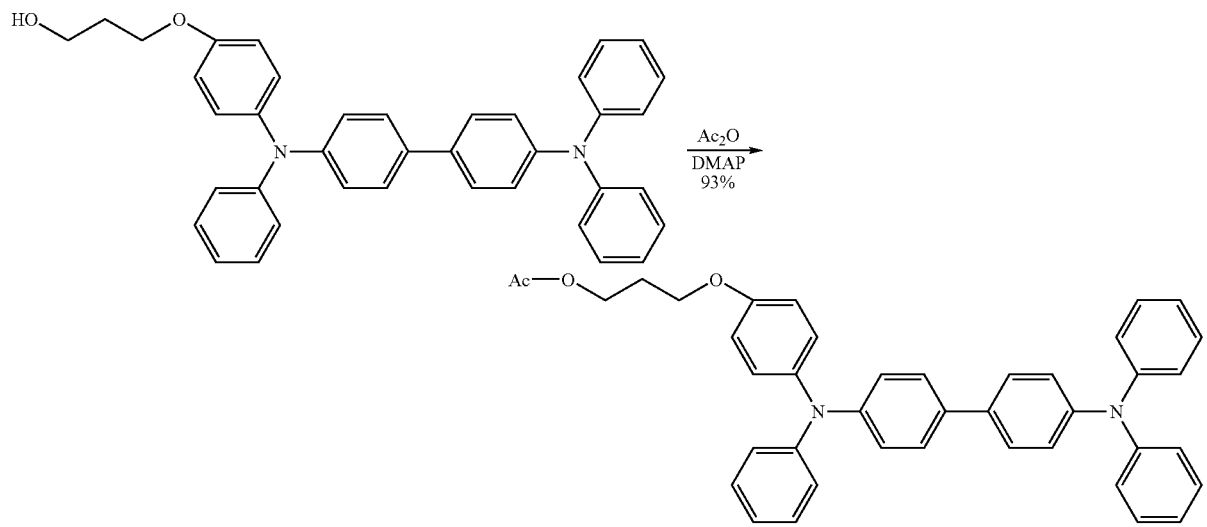

TPD alochol (2.8 g, 5.0 mmol), which was one intermediate for TPD acrylate monomer, was dissolved with dichloromethane (10 mL). Into this solution, acetic anhydride (0.8 mL, 10.6 mmol) and 4-(Dimethylamino)pyridine (100 mg, 0.82 mmol) were added and stirred at 50° C. for 16 hr. Water (5 mL) was added to the reaction mixture. The products were extracted with dichloromethane (10 mL). After removal of dichloromethane, the crude products were purified by silica gel column chromatography using hexanes-ethyl acetate (1:1) as eluent. The product was collected. Yield (2.97 g, 93%)

(c) Monomers Containing Non-Linear-Optical Groups

The non-linear-optical precursor monomer 5-[N-ethyl-N-4-formylphenyl]amino-pentyl acrylate was synthesized according to the following synthesis scheme:

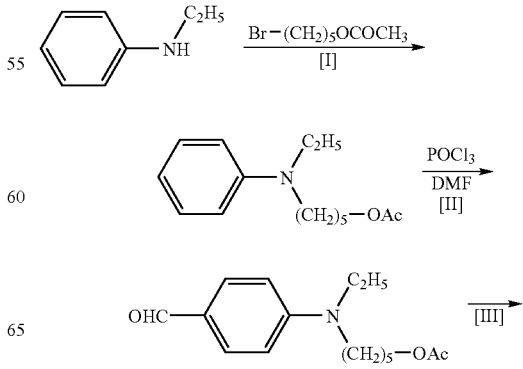

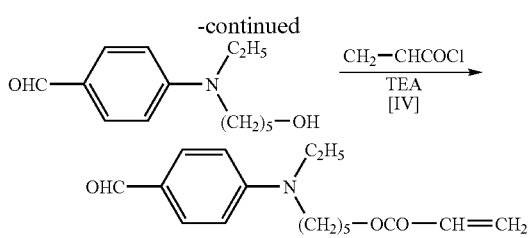

STEP I:

Into bromopentyl acetate (5 mL, 30 mmol) and toluene (25 mL), triethylamine (4.2 mL, 30 mmol) and N-ethylaniline (4 mL, 30 mmol) were added at room temperature. This solution was heated at 120° C. overnight. After cooling down, the reaction mixture was rotary-evaporated. The residue was purified by silica gel chromatography (developing solvent: hexane/acetone=9/1). An oily amine compound was obtained. (Yield: 6.0 g (80%))

STEP II:

Anhydrous DMF (6 mL, 77.5 mmol) was cooled in an ice-bath. Then, $POCl_3$ (2.3 mL, 24.5 mmol) was added dropwise into the 25 mL flask, and the mixture was allowed to come to room temperature. The amine compound (5.8 g, 23.3 mmol) was added through a rubber septum by syringe with dichloroethane. After stirring for 30 min., this reaction mixture was heated to 90° C. and the reaction was allowed to proceed for overnight under an argon atmosphere.

On the next day, the reaction mixture was cooled, and poured into and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained. (Yield: 4.2 g (65%))

STEP III:

The aldehyde compound (3.92 g, 14.1 mmol) was dissolved with methanol (20 mL). Into this, potassium carbonate (400 mg) and water (1 mL) were added at room temperature and the solution was stirred overnight. On the next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone=1/1). An aldehyde alcohol compound was obtained. (Yield: 3.2 g (96%))

STEP IV:

The aldehyde alcohol (5.8 g, 24.7 mmol) was dissolved with anhydrous THF (60 mL). Into this, triethylamine (3.8 mL, 27. 1 mmol) was added and the solution was cooled by ice-bath. Acrolyl chloride (2.1 mL, 26.5 mmol) was added and the solution was maintained at 0° C. for 20 minutes. Thereafter, the solution was allowed to warm up to room temperature and stirred at room temperature for 1 hour, at which point TLC indicated that all of the alcohol compound had disappeared. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 5.38g (76%), and the compound purity was 99% (by GC).

(d) Synthesis of Non-Linear-Optical Chromophore 7-DCST

The non-linear-optical precursor 7-DCST (7 member ring dicyanostyrene, 4-homopiperidinobenzylidene malononitrile) was synthesized according to the following two-step synthesis scheme:

A mixture of 4-fluorobenzaldehyde (17.8 g, 143 mmol), homopiperidine (15.0 g, 151 mmol), lithium carbonate (55 g, 744 mmol), and DMF (100 ML) were stirred at 50° C. for 16 hr. Water (500 mL) was added to the reaction mixture. The products were extracted with ether (1 L). After removal of ether, the crude products were purified by silica gel column chromatography using hexanes-ethyl acetate (9:1) as eluent. 4-(Dimethylamino)pyridine (100 mg, 0.82 mmol) was added to a solution of the 4-homopiperidinobenzaldehyde (18.2 g, 89.5 mmol) and malononitrile (9.1 g, 137.8 mmol) in methanol (60 mL). The reaction mixture was kept at room temperarture and the product was collected by filtration and purified by recrystallization from dichloromethane. Yield (17.1 g, 48%)

(e) $C_{60}$ Fullerene $C_{60}$ fullerene was purchased from MER, Tucson, Ariz. The purity of $C_{60}$ was 98% and up.

(f) Other Materials

Beside the above monomers and initiator, other chemicals, such as copper bromide and bipyridine were purchased from Aldrich Chemicals, Milwaukee, Wis.

Production Example 2

Preparation of $C_{60}$ Containing Charge Transport Homopolymer (TPD Acrylate Type)

(a) Preparation of TPD Homo-Polyacrylate Precursor Intermediate

N-[(meth)acroyloxypropylphenyl]-N,N', N'-triphenyl-(1, 1'-biphenyl)-4,4'-diamine (TPD acrylate) (1.6 g, 2.6 mmol), bipyridine (82 mg, 0.525 mmol; as a ligand), ethylene bis(2-bromo(chloro)-2-methylpropionate) (Br—BMP) (36 mg, 0.105 mmol; as a polymerization initiator), and toluene (2.1 g) were put into a three-necked flask. After purging by argon gas for 1 hour, CuBr (30 mg, 0.209 mmol; as transition metal catalyst) were added into this solution. Then, the solution was heated to 90° C., while continuing to purge with argon gas.

After 18 hrs polymerization, reaction mixture was checked by H-NMR to determine the conversion ratio and it was found out to be 71% based on integration ratio of polymer and monomer related methylene (—COOC$\underline{H}_2$—C$\underline{H}_2$—C$\underline{H}_2$—)signals. The polymer solution was diluted with toluene, and then filtered to remove non-dissolved impurities. The polymer was precipitated from the solution by adding methanol, the resulting polymer precipitate was collected and washed in diethyl ether and methanol to remove unreacted acrylate monomer and other impurities. The white polymer powder was collected and dried.

The weight average and number average molecular weights were measured by gel permeation chromatography, using a polystyrene standard. The results were Mp (peak top of molecular weight distribution)=8,317.

(b) Preparation of $C_{60}$-Containing TPD Homo-Polyacrylate Polymer

The obtained precursor polymer (680 mg), bipyridine (40 mg, 0.256 mmol; as a ligand), and chlorobenzene (4 mL) were put into a three-necked flask. After purging by argon gas for 1 hour, CuBr (14 mg, 0.100 mmol; as transition metal catalyst) and $C_{60}$ (80 mg, 0.111 mmol) were added into this solution. Then, the solution was heated to 90° C., while continuing to purge with argon gas.

After 18 hrs polymerization, chlorobenzene was evaporated by rotary evaporator and the residue mixture was dissolved with THF. Then the polymer solution was filtered to remove non-dissolved impurities by 0.2 µm pore size PTFE filter, because unreacted $C_{60}$ can not be soluble with THF. The polymer was precipitated from the solution by adding methanol, the resulting polymer precipitate was collected and washed in methanol to remove impurities. The black polymer powder was collected and dried.

The molecular weights were measured by gel permeation chromatography, using a polystyrene standard. The results were Mp (peak top of molecular weight distribution)=10,413. The molecular weight difference for Mp between precursor and $C_{60}$-containing polymers is 2,096, which is almost equivalent to two $C_{60}$ molecule molecular weight.

Production Example 3

Preparation of $C_{60}$-Containing Copolymer (Tetra-Functional Type)

(a) Preparation of Co-Polyacrylate Precursor Intermediate

N-[(meth)acroyloxypropylphenyl]-N,N',N'-triphenyl-(1,1'-biphenyl)-4,4'-diamine (TPD acrylate) (2.0 g, 3.24 mmol), the non-linear-optical precursor monomer 5-[N-ethyl-N-4-formylphenyl]amino-pentyl acrylate (0.60 g, 2.07 mmol), the plasticzer monomer 2-ethylhexyl acrylate (0.14 g, 0.76 mmol), bipyridine (220 mg, 1.40 mmol; as a ligand), ethylene bis(2-bromo (chloro)-2-methylpropionate) (Br—BMP) (100 mg, 0.28 mmol; as a polymerization initiator), and toluene (4.2 g) were put into a three-necked flask. After purging by argon gas for 1 hour, CuBr (80 mg, 0.56 mmol; as transition metal catalyst) were added into this solution. Then, the solution was heated to 80° C., while continuing to purge with argon gas.

After 18 hrs polymerization, reaction mixture was checked by H-NMR to determine the conversion ratio and it was found out to be almost 100% based on integration ratio of polymer and monomer related methylene (—COOC$\underline{H}_2$—C$\underline{H}_2$—C$\underline{H}_2$—)signals. The polymer solution was diluted with toluene, and then filtered to remove non-dissolved impurities. The polymer was precipitated from the solution by adding methanol, the resulting polymer precipitate was collected and washed in diethyl ether and methanol to remove unreacted acrylate monomers and other impurities. The white polymer powder was collected and dried. The weight average and number average molecular weights were measured by gel permeation chromatography, using a polystyrene standard. The results were Mw (weight average molecular weight)=7,825.

(b) Preparation of $C_{60}$-Containing TPD Co-Polyacrylate Polymer

The obtained precursor polymer (1.6 g), bipyridine (120 mg, 0.800 mmol; as a ligand), and chlorobenzene (10 mL) were put into a three-necked flask. After purging by argon gas for 1 hour, CuBr (46 mg, 0.32 mmol; as transition metal catalyst) and $C_{60}$ (216 mg, 0.30 mmol) were added into this solution. Then, the solution was heated to 90° C., while continuing to purge with argon gas.

After 18 hrs polymerization, chlorobenzene was evaporated by rotary evaporator and the residue mixture was dissolved with THF. Then the polymer solution was filtered to remove non-dissolved impurities by 0.2 µm pore size PTFE filter, because unreacted $C_{60}$ can not be soluble with THF. The polymer was precipitated from the solution by adding methanol, the resulting polymer precipitate was collected and washed in methanol to remove impurities. The black polymer powder was collected and dried.

The weight average and number average molecular weights were measured by gel permeation chromatography, using a polystyrene standard. The results were Mw (weight average molecular weight distribution)=12,857. There is the molecular weight difference between precursor and $C_{60}$-containing polymers, which means $C_{60}$ molecule incoprporation.

(c) Conversion of CHO Form into Dicyano Form

To convert the precursor CHO group in the polymer chain into group with dicyano functional group, the precipitate (1.68 g) was dissolved with CDCl$_3$ (8 mL). Into this solution, dicyanomalonate (340 mg, 5.15 mmol) and dimethylaminopyridine (60 mg) were added, and the resulting solution was stirred overnight at 40° C. The polymerization reaction was allowed to proceed, and the resulting polymer solution was diluted with toluene, followed by filtration to remove impurities and polymer precipitation into methanol. The precipitated polymer was collected and washed in methanol. The polymer yield was essentially 100%.

Production Reference 1

Non-$C_{60}$-Containing Charge Transport Homopolymer (TPD Acrylate Type)

The obtained TPD homo-polyacrylate precursor intermediate in Production Example 2 is used for the non-$C_{60}$-containing Charge Transport Homopolymer (TPD acrylate type). Obviously, the weight average and number average molecular weights were measured by gel permeation chromatography, using a polystyrene standard. The results were Mp (peak top of molecular weight distribution)=8,317.

Production Reference 2

Non-$C_{60}$ Containing Copolymer (Tetra-Functional Type)

The obtained co-polyacrylate precursor intermediate in Production Example 3 (0.85 g) was dissolved with $CDCl_3$ (5 mL). Into this solution, dicyanomalonate (170 mg, 2.58 mmol) and dimethylaminopyridine (20 mg) were added, and the resulting solution was stirred overnight at 40° C. The polymerization reaction was allowed to proceed, and the resulting polymer solution was diluted with toluene, followed by filtration to remove impurities and polymer precipitation into methanol. The precipitated polymer was collected and washed in methanol. The polymer yield was essentially 100%.

Example 1

Preparation of Photorefractive Composition

A photorefractive composition testing sample was prepared. The components of the composition were as follows:
(i) $C_{60}$-containing Charge Transport Homopolymer (TPD acrylate type) prepared in Production Example 2 30 wt %
(ii) Charge Transport Homopolymer (TPD acrylate type, non-$C_{60}$-containing type) prepared in Production Reference 1 30 wt %
(iii) Synthesized chromophore of 7-DCST 25 wt %
(iv) Synthesized plasticizer of TPD-aceate 15 wt %

To prepare the composition, the components listed above were dissolved with toluene and stirred at room temperature. After removing the solvent by rotary evaporator and vacuum pump, the residue was scratched and gathered.

To make testing samples, this powdery residue mixture was put on a slide glass and melted at 150° C. to make a 200–300 µm thickness film, or pre-cake. Small portions of this pre-cake were taken off and sandwiched between indium tin oxide (ITO) coated glass plates separated by a 105 µm spacer to form the individual samples.

Measurement 1

Diffraction Efficiency

The diffraction efficiency was measured at 633 nm by four-wave mixing experiments. Steady-state and transient four-wave mixing experiments were done using two writing beams making an angle of 20.5 degree in air; with the bisector of the writing beams making an angle of 60 degree relative to the sample normal.

For the four-wave mixing experiments, two s-polarized writing beams with equal intensity of 0.2 W/cm² in the sample were used; the spot diameter was 600 µm. A p-polarized beam of 1.7 mW/cm² counter propagating with respect to the writing beam nearest to the surface normal was used to probe the diffraction gratings; the spot diameter of the probe beam in the sample was 500 µm. The diffracted and the transmitted probe beam intensities were monitored to determine the diffraction efficiency. The diffraction efficiency of example 1 is 8% with biased voltage 6 kV/lm.

Measurement 2

Response Time

The diffraction efficiency were measured as a function of the applied field, using a procedure similar to that described in Measurement 1, by four-wave mixing experiments at 633 nm with s-polarized writing beams and a p-polarized probe beam. The angle between the bisector of the two writing beams and the sample normal was 60 degree. The writing beams had equal optical powers of 0.45 mW/cm², leading to a total optical power of 0.5 mW on the polymer, after correction for reflection losses. The beams were collimated to a spot size of approximately 500 µm. The optical power of the probe was 4 mW. The measurement of the grating buildup time were done as follows: an electric field of 40 V/µm was applied to the sample, and the sample was illuminated with one of the two writing beams and the probe beam for 100 ms. Then, the evolution of the diffracted beam was recorded. The response time was estimated as the time based on the equation in below, in which the smaller number is defined as the response time between $J_1$ and $J_2$.

$$\eta(t) = A \sin^2[B(1-a_1 e^{-t/J1} - a_2 e^{-t/J2})]$$

with $$a_1 + a_2 = 1$$

where $\eta(t)$ is the diffraction efficiency at time t, and A, B, $a_1$, and $a_2$ are fitting parameters, $J_1$ and $J_2$ are the grating build-up times. Between $J_1$ and $J_2$, the smaller number is defined as the response time. The response time of example 1 is 18 msec with biased voltage 6 kV/µm.

Measurement 3

Testing Sample Stability

The stability of a testing sample was determined after certain period (days) storage in room temperature or 60° C. The testing samples were observed either in bare eye or by microscope whether crystallization occurred or not in samples. Even if tiny crystallization occurred, the sample was categorized as "phase separated." Otherwise, the sample was categorized as "No phase separated."

Example 2

A photorefractive composition was obtained in the same manner as in the Example 1 except that composition ratio was changed to the ratio as described in below.

The components of the composition were as follows:
(i) $C_{60}$-containing Charge Transport Homopolymer (TPD acrylate type) prepared in Production Example 2 15 wt %
(ii) Charge Transport Homopolymer (TPD acrylate type, non-$C_{60}$-containing type) prepared in Production Reference 1 45 wt %
(iii) Synthesized chromophore of 7-DCST 25 wt %
(iv) Synthesized plasticizer of TPD-aceate 15 wt %

The diffraction efficiency and the response time of example 2 are 8% and 13 msec with biased voltage 6 kV/µm, respectively.

Example 3

A photorefractive composition was obtained in the same manner as in the Example 1 except that $C_{60}$-containing Copolymer prepared in Production Example 3 was used and composition ratio was changed to the ratio as described in below.

The components of the composition were as follows:
(i) $C_{60}$-containing Copolymer (TPD/DCST/2-EHA poly acrylate copolymer type) prepared in Production Example 3 15 wt %
(ii) Copolymer (TPD/DCST/2-EHA poly acrylate copolymer type, non-$C_{60}$-containing type) prepared in Production Reference 2 45 wt %
(iii) Synthesized chromophore of 7-DCST 25 wt %
(iv) Synthesized plasticizer of TPD-aceate 15 wt %

The diffraction efficiency and the response time of example 3 are 9% and 12 msec with biased voltage 6 kV/μm, respectively.

Comparative Example 1

A photorefractive composition testing sample was prepared. The components of the composition were as follows:
(i) Charge Transport Homopolymer (TPD acrylate type, non-$C_{60}$-containing type) prepared in Production Reference 1 60 wt %
(ii) Synthesized chromophore of 7-DCST 28.6 wt %
(iii) Synthesized plasticizer of TPD-aceate 10.9 wt %

The diffraction efficiency and the response time of comparative example 1 are 23% and 208 msec with biased voltage 6 kV/μm, respectively. No addition of $C_{60}$, which means this composition gave very slow response time due to the absence of $C_{60}$.

Comparative Example 2

A photorefractive composition testing sample was prepared. The components of the composition were as follows:
(i) Copolymer (TPD/DCST/2-EHA poly acrylate copolymer type, non-$C_{60}$-containing type) prepared in Production Reference 2 60 wt %
(ii) Synthesized chromophore of 7-DCST 25 wt %
(iii) Synthesized plasticizer of TPD-aceate 15 wt %

The diffraction efficiency of comparative example 2 is 1.5% with biased voltage 6 kV/μm. The diffraction signal was too weak to evaluate the response time. No addition of $C_{60}$ nor $C_{60}$ containing copolymer, which means this composition gave small diffraction efficiency due to the absence of $C_{60}$ in this case.

What is claimed is:

1. A composition comprising a fullerene-containing polymer obtained by reacting a polymer prepared by living radical polymerization with a fullerene wherein:
   (a) the living radical polymerization is carried out using a monomer, a polymerization initiator, transition metal catalyst and a ligand capable of reversibly forming a complex with the transition metal catalyst,
   (b) the polymer comprises at least one of a first repeat unit including a moiety having charge transport ability and a second repeat unit including a moiety having non-linear-optical ability, and
   (c) the composition exhibits photorefractive ability.

2. The composition of claim 1, wherein the moiety having charge transport ability is selected from the group consisting of the structures (i), (ii) and (iii):

Structure (i)

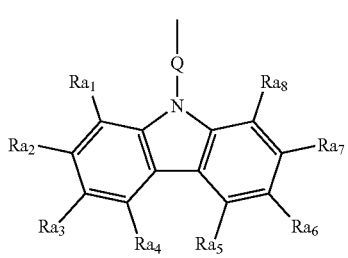

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

Structure (ii)

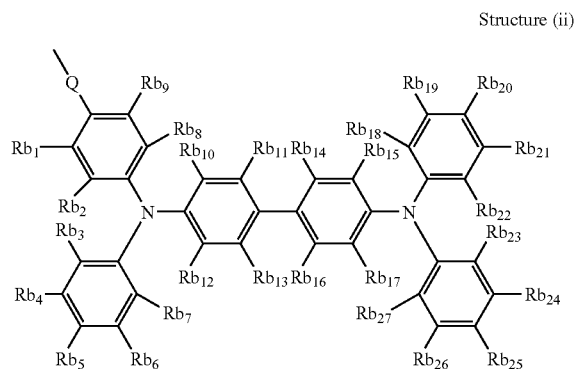

wherein $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

Structure (iii)

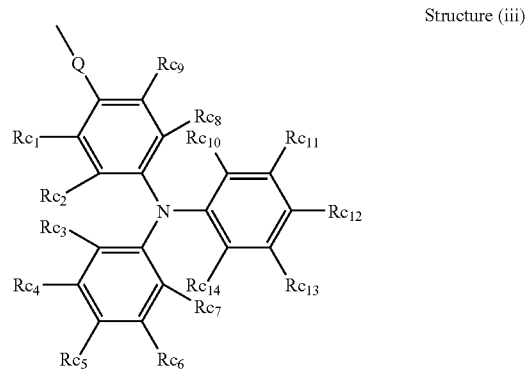

wherein $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons.

3. The composition of claim 1, wherein the moiety having non-linear-optical ability is represented by the formula (0);

formula (0)

wherein Q represents an alkylene group, with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

4. The composition of claim 3, wherein G in formula (0) is represented by a structure selected from the group consisting of the structures (iv), (v) and (vi);
wherein structures (iv), (v) and (vi) are:

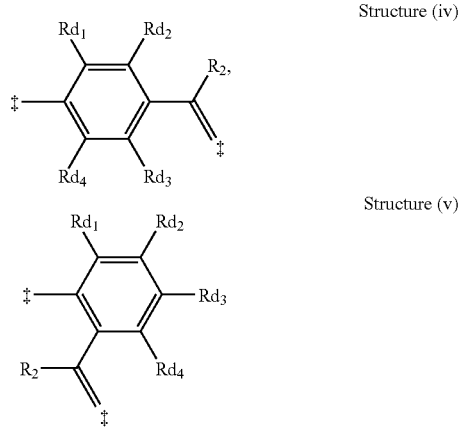

Structure (iv)

Structure (v)

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

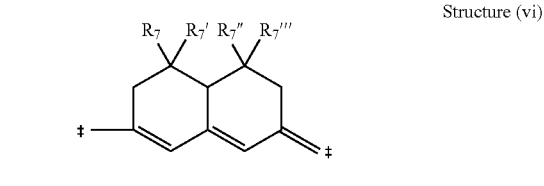

Structure (vi)

wherein $R_7$, $R_7'$, $R_7''$, and $R_7'''$ each independently represent hydrogen or a linear or branched alkyl group with up to 10 carbons; and wherein Eacpt is an electron acceptor group and represented by a structure selected from the group consisting of the structures;

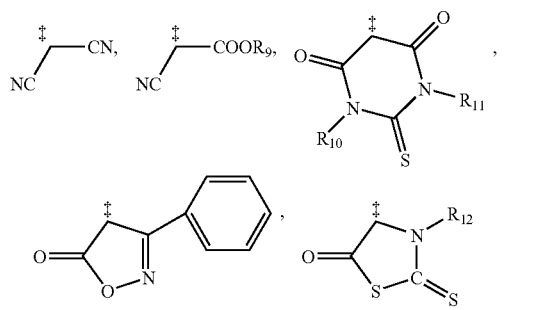

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

5. The composition of claim 1, wherein the moiety having charge transport ability is selected from the group consisting of the structures (i), (ii) and (iii) and the moiety having non-linear-optical ability is represented by the formula (0);
wherein the structures (i), (ii) and (iii) are:

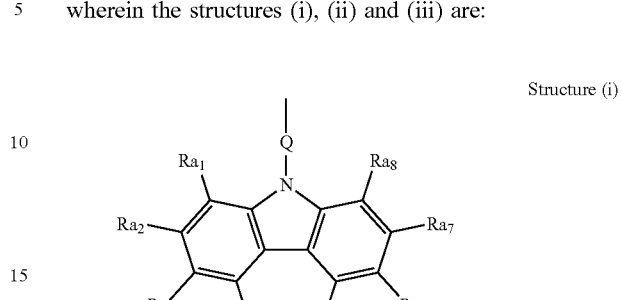

Structure (i)

wherein Q represents an alkylene group, with or without a hetero atom; $Ra_1$, $Ra_2$, $Ra_3$, $Ra_4$, $Ra_5$, $Ra_6$, $Ra_7$, and $Ra_8$ are independently selected from the group consisting of a hydrogen atom, a linear alkyl group with up to 10 carbons, a branched alkyl group with up to 10 carbons, and an aromatic group with up to 10 carbons;

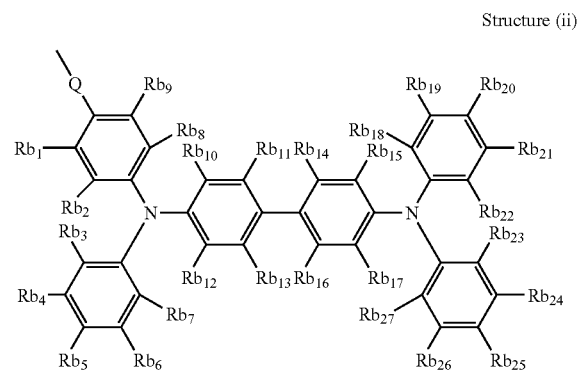

Structure (ii)

wherein $Rb_1$–$Rb_{27}$ are each independently selected from the group consisting of a hydrogen atom, a linear alkyl group with up to 10 carbons, a branched alkyl group with up to 10 carbons, and an aromatic group with up to 10 carbons;

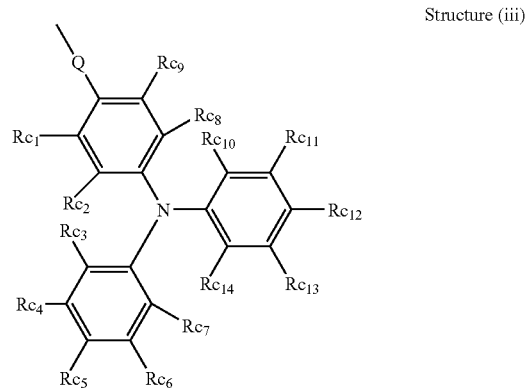

Structure (iii)

wherein $Rc_1$–$Rc_{14}$ are each independently selected from the group consisting of a hydrogen atom, a linear alkyl group with up to 10 carbons, a branched alkyl group with up to 10 carbons, and an aromatic group with up to 10 carbons;

wherein the formula (0) is:

formula (0)

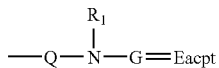

wherein $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

6. The composition of claim 5, wherein G in formula (0) is represented by a structure selected from the group consisting of the structures (iv), (v) and (vi);

wherein structures (iv), (v) and (vi) are:

Structure (iv)

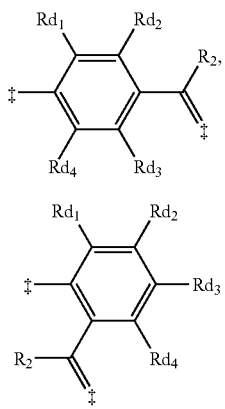

Structure (v)

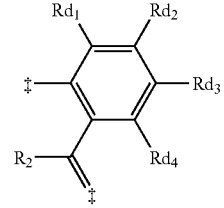

wherein, in both structures (iv) and (v), $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons;

Structure (vi)

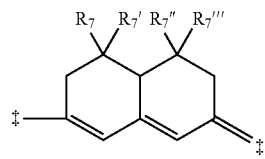

wherein $R_7$, $R_7'$, $R_7''$, and $R_7'''$ each independently represent hydrogen or a linear or branched alkyl group with up to 10 carbons; and wherein Eacpt in formula (0) is an electron acceptor group and represented by a structure selected from the group consisting of the structures;

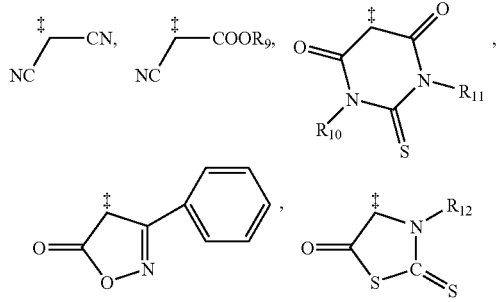

wherein $R_9$, $R_{10}$, $R_{11}$ and $R_{12}$ are each independently selected from the group consisting of a hydrogen atom, a linear alkyl group with up to 10 atoms, a branched alkyl group with up to 10 atoms, and an aromatic group with up to 10 carbons.

7. The composition of claim 1, wherein the monomer is an acrylate-based monomer.

8. The composition of claim 1, wherein the transition metal catalyst is selected from the group consisting of copper bromide and copper chloride.

9. The composition of claim 1, wherein the polymerization initiator is selected from the group consisting of α-halogenated ester and α-halogenated styrene.

10. The composition of claim 1, wherein the ligand is selected from the group consisting of bipyridines, mercaptans, and trifluorates.

11. The composition of claim 1, further comprising a plasticizer.

12. The composition of claim 1, further comprising a sensitizer.

13. The composition of claim 1, wherein the polymer has a glass transition temperature of about 125° C. or less.

14. The composition of claim 1, wherein the composition has a response time of no longer than about 50 miliseconds as measured under an electric field of no greater than about 60 V/μm.

* * * * *

UNITED STATES PATENT AND TRADEMARK OFFICE
CERTIFICATE OF CORRECTION

PATENT NO.        : 7,186,781 B2                                    Page 1 of 2
APPLICATION NO. : 10/895726
DATED             : March 6, 2007
INVENTOR(S)       : Michiharu Yamamoto It is certified that error appears in the above-identified patent and that said Letters Patent is hereby corrected as shown below:

At Column 2, Line 61, after "with" please delete "an" and insert --a--, therefor.

At Column 3, Line 33, please delete "photorefrative" and insert --photorefractive--, therefor.

At Column 15, Line 1, please delete "(IV);" and insert --(IVc):--, therefor.

At Column 23, Lines 10-16, please delete

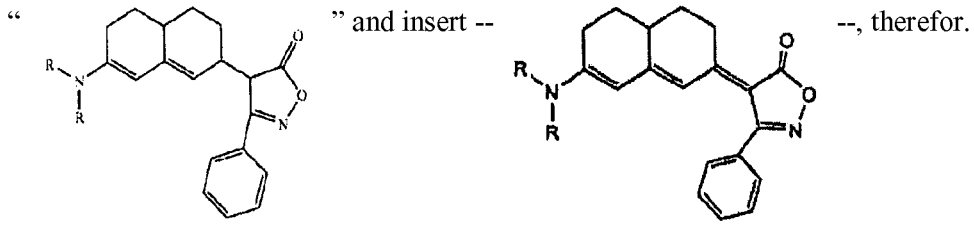

At Column 25, Line 6 (approximately), after "Structure" please delete "I" and insert --1--, therefor.

At Column 25, Line 58 (approximately), after "consisting of" please insert --:--.

At Column 25, Lines 61-64 (approximately), please delete "$H_2N-CN$ / NC" and insert -- $H_2C-CN$ / NC --, therefor.

At Column 25, Lines 61-64 (approximately), please delete "$H_2N-COOR_9$ / NC" and insert -- $H_2C-COOR_9$ / NC --, therefor.

UNITED STATES PATENT AND TRADEMARK OFFICE
CERTIFICATE OF CORRECTION

| | |
|---|---|
| PATENT NO. | : 7,186,781 B2 |
| APPLICATION NO. | : 10/895726 |
| DATED | : March 6, 2007 |
| INVENTOR(S) | : Michiharu Yamamoto |

It is certified that error appears in the above-identified patent and that said Letters Patent is hereby corrected as shown below:

At Column 26, Line 19, please delete "1-100" and insert --1 to 100--, therefor.

At Column 28, Line 5, please delete "$C_{2-14}$alkyl" and insert --$C_{2-14}$ alkyl--, therefor.

At Column 30, Line 20, please delete "photorefrative" and insert --photorefractive--, therefor.

At Column 33, Line 51, please delete "alochol" and insert --alcohol--, therefor.

At Column 36, Line 45, please delete "temperarture" and insert --temperature--, therefor.

At Column 36, Line 62 (approximately), please delete "Precusor" and insert --Precursor--, therefor.

At Column 37, Line 59, please delete "plasticzer" and insert --plasticizer--, therefor.

At Column 39, Line 56, please delete "6 kV/Im." and insert --6 kV/$\mu$m.--, therefor.

At Column 41, Line 38 (approximately), in Claim 1, after "fullerene" please insert --,--.

At Column 44, Line 21 (approximately), in Claim 5, please delete "$Ra_3$," and insert --$Ra_3$,--, therefor.

Signed and Sealed this

Sixteenth Day of September, 2008

JON W. DUDAS
*Director of the United States Patent and Trademark Office*